(12) United States Patent
Zhu et al.

(10) Patent No.: US 12,041,516 B2
(45) Date of Patent: Jul. 16, 2024

(54) MULTICAST COMMUNICATION METHOD, AND APPARATUS AND SYSTEM

(71) Applicant: Huawei Technologies Co., Ltd., Shenzhen (CN)

(72) Inventors: Qianghua Zhu, Beijing (CN); Fenqin Zhu, Shanghai (CN); Wenfu Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 391 days.

(21) Appl. No.: 17/644,678

(22) Filed: Dec. 16, 2021

(65) Prior Publication Data

US 2022/0109962 A1 Apr. 7, 2022

Related U.S. Application Data

(63) Continuation of application No. PCT/CN2020/096633, filed on Jun. 17, 2020.

(30) Foreign Application Priority Data

Jun. 17, 2019 (CN) .......................... 201910523377.8

(51) Int. Cl.
*H04W 4/06* (2009.01)
*H04L 47/2483* (2022.01)
(Continued)

(52) U.S. Cl.
CPC ........... *H04W 4/06* (2013.01); *H04L 47/2483* (2013.01); *H04W 8/26* (2013.01); *H04W 28/06* (2013.01); *H04W 80/02* (2013.01)

(58) Field of Classification Search
CPC ......... H04W 4/06; H04W 8/26; H04W 28/06; H04W 80/02; H04W 76/11; H04W 76/22;
(Continued)

(56) References Cited

U.S. PATENT DOCUMENTS 8,689,315 B2 4/2014 Swander et al.
2016/0198330 A1 7/2016 Chung et al.
(Continued)

FOREIGN PATENT DOCUMENTS

CN 101521586 A 9/2009
CN 108419270 A 8/2018
(Continued)

OTHER PUBLICATIONS

Ericsson et al., "Updating General description of solution 1 in 23.725 for user plane redundancy", 3GPP TSG-SA WG2 Meeting #131 S2-1901960, Feb. 25-Mar. 1, 2019, 8 pages, Tenerife (Spain).
(Continued)

*Primary Examiner* — Afshawn M Towfighi
(74) *Attorney, Agent, or Firm* — Slater Matsil, LLP

(57) ABSTRACT

Embodiments of this application provide a multicast communication method that includes: receiving, by a user plane function network element, a multicast packet, where the multicast packet includes a multicast address; matching, by the user plane function network element, the multicast packet with a packet detection rule PDR on the user plane function network element; and if the multicast packet successfully matches a first PDR, and the first PDR indicates to carry on matching another PDR, carrying on, by the user plane function network element, matching the multicast packet with another PDR. Optionally, the another PDR is a PDR whose priority is not higher than that of the first PDR.

21 Claims, 14 Drawing Sheets

(51) Int. Cl.
  *H04W 8/26*     (2009.01)
  *H04W 28/06*    (2009.01)
  *H04W 80/02*    (2009.01)
(58) Field of Classification Search
  CPC ..... H04W 76/40; H04W 76/10; H04W 76/20;
        H04W 8/04; H04W 76/12; H04W 92/24;
        H04L 47/2483; H04L 45/16; H04L 45/74;
                    H04L 47/24; H04L 5/0053
  See application file for complete search history.

(56) References Cited

U.S. PATENT DOCUMENTS

| | | | |
|---|---|---|---|
| 2019/0132251 A1 | 5/2019 | Dao et al. | |
| 2019/0158408 A1 | 5/2019 | Li et al. | |
| 2020/0351984 A1* | 11/2020 | Talebi Fard | .......... H04W 76/40 |
| 2021/0274323 A1* | 9/2021 | Xu | ........................ H04W 4/08 |

FOREIGN PATENT DOCUMENTS

| | | |
|---|---|---|
| CN | 109548063 A | 3/2019 |
| CN | 109768868 A | 5/2019 |
| JP | 2004364305 A | 12/2004 |
| WO | 2019096186 A1 | 5/2019 |

OTHER PUBLICATIONS

"3rd Generation Partnership Project; Technical Specification Group Core Network and Terminals; 5G System—Phase 1, CT WG4 Aspects (Release 15)," 3GPP TR 29.891 V15.0.0, Dec. 2017, 146 pages.

"Discussion Paper for 5GLAN Path Management," Document for: Discussion and Agreement, Agenda Item: 6.15.1, Work Item/Release; Veritcal_LAN /Rel-16, Source: OPPO, SA WG2 Meeting #131, S2-1902162, Feb. 25-Mar. 1, 2019, 6 pages.

"IPTV Solution Update," Document for: Approval, Agenda Item: 6.7, Work Item/Release: 5WWC, Source: Huawei, HiSilicon, SA WG2 Temporary Document, 3GPP STG-SA WG2 Meeting #132, S2-1903723 (revision of S2-19xxxx), Apr. 8-12, 2019, 11 pages.

"Support of Forwarding of Broadcast and Multicast Packets," Source to WG: Huawei, Silicon, Source to TSG: SA2, Work Item Code: Vertical_LAN, Category: C, Release: Rel-16, Change Request, 23.501, CR 1659, rev—Current version: 16.1.0, 3GPP TSG-SA2 Meeting #134, S2-1907700, Jun. 24-28, 2019, 16 pages.

Ericsson, "Control of traffic forwarding to support 5G LAN group communication", 3GPP TSG CT WG4 Meeting #90, C4-191094, Apr. 8-12, 2019 , 4 pages, Xi'an, P.R. China.

3GPP TS 23.501 V16.1.0, "3rd Generation Partnership Project; Technical Specification Group Services and System Aspects; System Architecture for the 5G System; Stage 2(Release 16)", Jun. 2019, 367 pages.

Huawei et al., "discussion on 5G VN group communication", 3GPP TSG-SA WG2 Meeting #133, S2-1905681, May 13-17, 2019, 5 pages, Reno, Nevada, USA.

3GPP TS 29.244 V16.0.0 (Jun. 2019), "3rd Generation Partnership Project; Technical Specification Group Core Network and Terminals; Interface between the Control Plane and the User Plane Nodes; Stage 3(Release 16)", 217 pages.

Huawei et al., "discussion on forwarding of broadcast and multicast packets", 3GPP TSG-SA WG2 Meeting #134 52-1907699, Jun. 24-Jun. 28, 2019, 3 pages, Sapporo, Japan.

Huawei et al., "support for 5GLAN communication key issue", 3GPP TSG-SA WG2 Meeting #128, S2-187554, Jul. 2-6, 2018, 4 pages, Vilnius, Lithuania.

ZTE, "adding multicast forwarding for the VN communication", 3GPP TSG-SA WG2 Meeting #135, S2-1909426, Oct. 14-18, 2019, 4 pages, Split, Croatia.

Huawei et al., "5GLAN communication", 3GPP TSG-SA WG2 Meeting #131, S2-1902005, Feb. 25-Mar. 1, 2019, 14 pages, Santa Cruz, Tenerife, ES.

Huawei et al., "5GLAN communication", 3GPP TSG-SA WG2 Meeting #131, S2-1902006, Feb. 25-Mar. 1, 2019, 20 pages, Santa Cruz, Tenerife, ES.

Huawei et al., "Support for unicast traffic forwarding within a 5G VN group", 3GPP TSG-SA WG2 Meeting #133, S2-1906682, May 13-17, 2019, 10 pages, Reno, Nevada, USA.

Huawei et al., "implementation of 5GLAN related interfaces", 3GPP TSG-SA WG2 Meeting #133, S2-1906685, May 13-17, 2019, 10 pages, Reno, Nevada, USA.

* cited by examiner

MULTICAST COMMUNICATION METHOD, AND APPARATUS AND SYSTEM

CROSS-REFERENCE TO RELATED APPLICATIONS

This application is a continuation of International Application No. PCT/CN2020/096633, filed on Jun. 17, 2020, which claims priority to Chinese Patent Application No. 201910523377.8, filed on Jun. 17, 2019. The disclosures of the aforementioned applications are hereby incorporated by reference in their entireties.

TECHNICAL FIELD

This application relates to the field of communications technologies, and in particular, to a multicast communication method, and an apparatus and a system.

BACKGROUND

Currently, a 3rd generation partnership project (3GPP) technical specification (technical standard, TS) 29.244 defines a manner of forwarding a packet on a user plane, and an architecture of forwarding a packet on a user plane is shown in FIG. 1. A working mechanism of forwarding a packet on a user plane is as follows: After receiving a packet from an ingress (for example, an N3 interface), a user plane function (UPF) network element determines, based on a 5th generation (5G) user plane protocol identifier (for example, a tunnel endpoint identifier (TEID)) of the packet, a session to which the packet belongs. Then, the UPF network element matches a packet detection rule (PDR) (there may be one or more packet detection rules) in an N4 session context of the session with characteristic information of the packet, to find a PDR that matches the packet. The PDR specifies a forwarding action rule (FAR), a quality of service (QoS) enforcement rule (QER), and a usage reporting rule (URR) that correspond to the packet. Further, the UPF network element may perform an operation, such as dropping (drop), forwarding (forward), buffering (buffer), reporting (notify) to a control plane, or duplicating (duplicate), on the packet according to the FAR. The UPF network element may perform a QoS operation on the packet according to the QER. The UPF network element may perform usage reporting on the packet according to the URR. Finally, the packet is transmitted through an egress (for example, an N6 interface). In a process in which the UPF network element forwards the packet according to the FAR, critical actions include specifying an egress identifier and an egress action. The egress action may include, for example, adding outer header creation, transport level marking, a forwarding policy, or header enrichment.

However, when the foregoing solution is used in multicast communication, in a current packet processing mechanism of the UPF network element, a multicast packet can match only one PDR in one session, and then a data packet is duplicated according to the FAR. In this process, tunnel information or a label of a to-be-duplicated data packet needs to be explicitly indicated in the FAR. In addition, when a terminal device member changes, indication information in the FAR needs to be correspondingly updated. This method is complex and inefficient. Therefore, how to improve efficiency of forwarding a multicast packet is an urgent problem to be resolved currently.

SUMMARY

Embodiments of this application provide a multicast communication method, and an apparatus and a system, to improve efficiency of forwarding a multicast packet.

To achieve the foregoing objective, the following technical solutions are used in the embodiments of this application.

According to a first aspect, a multicast communication method is provided. The method includes: A user plane function network element receives a multicast packet. The multicast packet includes a multicast address. The user plane function network element matches the multicast packet with a packet detection rule PDR on the user plane function network element. If the multicast packet successfully matches a first PDR, and the first PDR indicates to carry on matching another PDR, the user plane function network element carries on matching the multicast packet with another PDR. Optionally, the another PDR is a PDR whose priority is not higher than that of the first PDR. In this embodiment of this application, after the multicast packet successfully matches the first PDR that indicates to carry on matching another PDR, the user plane function network element carries on matching the multicast packet with another PDR whose priority is not higher than that of the first PDR on the user plane function network element. In other words, according to the solution provided in this application, the multicast packet received by the user plane function network element may match a plurality of PDRs, so that the multicast packet can be forwarded to a plurality of terminal devices according to rules (for example, FARs) associated with the plurality of matched PDRs. In this solution, when a terminal device member changes, a session management function network element does not need to perform excessive operations. Therefore, compared with a solution in which indication information in a FAR needs to be correspondingly updated when a terminal device member changes, this solution can improve efficiency of forwarding a multicast packet, reduce a signaling interaction procedure that is related to FAR updating and that is between the session management function network element and the user plane function network element, and reduce signaling overheads.

In a possible design, the method further includes: If packet duplication information corresponding to the first PDR matches sender information of the multicast packet, the user plane function network element duplicates the multicast packet, and processes a duplicated multicast packet according to a rule associated with the first PDR. Alternatively, if packet duplication information corresponding to the first PDR does not match sender information of the multicast packet, the user plane function network element skips a process of processing the multicast packet according to a rule associated with the first PDR. In other words, in this embodiment of this application, after the user plane function network element receives the multicast packet, the multicast packet may match a plurality of PDRs. If packet duplication information corresponding to the matched PDRs matches the sender information of the multicast packet, the multicast packet can be forwarded to a plurality of terminal devices according to rules (for example, FARs) associated with the plurality of PDRs. If packet duplication information corresponding to the matched PDRs does not match the sender information of the multicast packet, to avoid a broadcast storm, the user plane function network element skips a process of processing the multicast packet according to rules associated with the PDRs.

In a possible design, that the packet duplication information corresponding to the first PDR matches the sender information of the multicast packet includes: The packet duplication information corresponding to the first PDR is different from the sender information of the multicast packet. That the packet duplication information corresponding to the first PDR does not match the sender information of the multicast packet includes: The packet duplication information corresponding to the first PDR is the same as the sender information of the multicast packet.

In a possible design, the method further includes: If packet duplication skip information corresponding to the first PDR does not match sender information of the multicast packet, the user plane function network element duplicates the multicast packet, and processes a duplicated multicast packet according to a rule associated with the first PDR. Alternatively, if packet duplication skip information corresponding to the first PDR matches sender information of the multicast packet, the user plane function network element skips a process of processing the multicast packet according to a rule associated with the first PDR. In other words, in this embodiment of this application, after the user plane function network element receives the multicast packet, the multicast packet may match a plurality of PDRs. If packet duplication skip information corresponding to the matched PDRs does not match the sender information of the multicast packet, the multicast packet can be forwarded to a plurality of terminal devices according to rules (for example, FARs) associated with the plurality of PDRs. If packet duplication skip information corresponding to the matched PDRs matches the sender information of the multicast packet, to avoid a broadcast storm, the user plane function network element skips a process of processing the multicast packet.

In a possible design, that the packet duplication skip information corresponding to the first PDR matches the sender information of the multicast packet includes: The packet duplication skip information corresponding to the first PDR is the same as the sender information of the multicast packet. That the packet duplication skip information corresponding to the first PDR does not match the sender information of the multicast packet includes: The packet duplication skip information corresponding to the first PDR is different from the sender information of the multicast packet.

In a possible design, the multicast packet includes the sender information of the multicast packet, and the sender information of the multicast packet includes address information of a terminal device that sends the multicast packet.

In a possible design, the method further includes: The user plane function network element receives the sender information of the multicast packet. The sender information of the multicast packet includes N19 indication information or N6 indication information. For example, the N19 indication information may be, for example, a GTP-U TEID of an N19 tunnel connecting the current UPF network element to another UPF network element, and the N6 indication information may be, for example, information about an N6 interface.

In a possible design, the N6 indication information or the N19 indication information is included in general packet radio service GPRS tunneling protocol-user plane GTP-U tunnel header information.

In a possible design, that the user plane function network element matches the multicast packet with the PDR on the user plane function network element includes: The user plane function network element determines an N4 session that matches the multicast packet and that is on the user plane function network element, and the user plane function network element matches the multicast packet with each of PDRs in the N4 session in descending order of priorities of the PDRs. In other words, in this embodiment of this application, when matching the multicast packet with the PDR on the user plane function network element, the user plane function network element first matches the multicast packet with an N4 session to which the PDR belongs. Further, the user plane function network element matches the multicast packet with each of the PDRs in the N4 session in descending order of priorities of the PDRs.

In a possible design, that the user plane function network element matches the multicast packet with the PDR on the user plane function network element includes: The user plane function network element matches the multicast packet with each of PDRs on the user plane function network element in descending order of priorities of the PDRs. In other words, in this embodiment of this application, when matching the multicast packet with the PDR on the UPF network element, the user plane function network element directly matches the multicast packet with each of the PDRs on the user plane function network element in descending order of priorities of the PDRs.

In a possible design, the first PDR includes a type indication, an indication to carry on matching, packet duplication information, or packet duplication skip information. The type indication, the indication to carry on matching, the packet duplication information, or the packet duplication skip information is used to indicate to carry on matching another PDR.

In a possible design, the method further includes: The user plane function network element receives an N4 session identifier and the first PDR from a session management function network element. The first PDR is used to detect the multicast packet. The user plane function network element configures the first PDR in the N4 session corresponding to the N4 session identifier. In other words, in this embodiment of this application, the session management function network element may configure, for the user plane function network element, the PDR that is used to detect the multicast packet.

In a possible design, the multicast packet is a broadcast packet, and correspondingly, the multicast address is a broadcast address.

In a possible design, the multicast packet includes a groupcast packet, and correspondingly, the multicast address is a groupcast address.

According to a second aspect, a multicast communication method is provided. The method includes: A session management function network element obtains a first packet detection rule PDR. The first PDR is used to detect a multicast packet, and the first PDR indicates to carry on matching another PDR. The session management function network element sends an N4 session identifier and the first PDR to a user plane function network element. The N4 session identifier and the first PDR are used to configure the first PDR in an N4 session that is corresponding to the N4 session identifier and that is on the user plane function network element. In this embodiment of this application, routing rules configured by the session management function network element for the N4 session on the user plane function network element include the first PDR that is used to detect the multicast packet, and the first PDR indicates to carry on matching another PDR. In this way, after the multicast packet successfully matches the first PDR, the user plane function network element may carry on matching the multicast packet with another PDR whose priority is not higher than that of the first PDR on the user plane function network element. In other words, according to the solution provided in this application, the multicast packet received by the user plane function network element may match a plurality of PDRs, so that the multicast packet can be forwarded to a plurality of terminal devices according to rules (for example, FARs) associated with the plurality of PDRs. In this solution, when a terminal device member changes, a session management function network element does not need to perform excessive operations. Therefore, compared with a solution in which indication information in a FAR needs to be correspondingly updated when a terminal device member changes, this solution can improve efficiency of forwarding a multicast packet, reduce a signaling interaction procedure that is related to FAR updating and that is between the session management function network element and the user plane function network element, and reduce signaling overheads.

In a possible design, the first PDR includes a type indication, an indication to carry on matching, packet duplication information, or packet duplication skip information. The type indication, the indication to carry on matching, the packet duplication information, or the packet duplication skip information is used to indicate to carry on matching another PDR.

In a possible design, the multicast packet is a broadcast packet, and correspondingly, the first PDR includes a broadcast address. The method further includes: The session management function network element determines a first N4 session that is corresponding to a group and that is on the user plane function network element. The broadcast packet belongs to the group, and the first N4 session is any one of all N4 sessions that are corresponding to the group and that are on the user plane function network element. Correspondingly, the N4 session identifier is an identifier of the first N4 session. In other words, in this embodiment of this application, if the multicast packet is a broadcast packet, the session management function network element needs to configure broadcast-type PDRs for all the N4 sessions that are corresponding to the group and that are on the user plane function network element.

In a possible design, the multicast packet is a groupcast packet, and correspondingly, the first PDR includes a groupcast address. The method further includes: The session management function network element determines a second N4 session that is corresponding to a group and that is on the user plane function network element. The groupcast packet belongs to the group, and the second N4 session is any one of N4 sessions on the user plane function network element that are corresponding to the group and that support forwarding of the groupcast packet. Correspondingly, the N4 session identifier is an identifier of the second N4 session. In other words, in this embodiment of this application, if the multicast packet includes a groupcast packet, the session management function network element needs to configure groupcast-type PDRs for all the N4 sessions that are corresponding to the group and that support groupcast communication.

In a possible design, that the session management function network element determines the second N4 session that is corresponding to the group and that is on the user plane function network element includes: The session management function network element determines, based on an internet group management protocol IGMP join message, a non-access stratum NAS message, or an application function AF message, the second N4 session that is corresponding to the group and that is on the user plane function network element.

According to a third aspect, a communications apparatus is provided, and is configured to implement the foregoing methods. The communications apparatus may be the user plane function network element in the first aspect, or an apparatus including the user plane function network element. Alternatively, the communications apparatus may be the session management function network element in the second aspect, or an apparatus including the session management function network element. The communications apparatus includes a corresponding module, unit, or means for implementing the foregoing method. The module, unit, or means may be implemented by using hardware or software, or implemented by using hardware by executing corresponding software. The hardware or the software includes one or more modules or units corresponding to the foregoing functions.

According to a fourth aspect, a communications apparatus is provided, and includes a processor and a memory. The memory is configured to store a computer instruction, and when the processor executes the instruction, the communications apparatus is enabled to perform the method according to any one of the foregoing aspects. The communications apparatus may be the user plane function network element in the first aspect, or an apparatus including the user plane function network element. Alternatively, the communications apparatus may be the session management function network element in the second aspect, or an apparatus including the session management function network element.

According to a fifth aspect, a communications apparatus is provided, and includes a processor. The processor is configured to: after being coupled to a memory and reading an instruction in the memory, perform, according to the instruction, the method according to any one of the foregoing aspects. The communications apparatus may be the user plane function network element in the first aspect, or an apparatus including the user plane function network element. Alternatively, the communications apparatus may be the session management function network element in the second aspect, or an apparatus including the session management function network element.

According to a sixth aspect, a computer readable storage medium is provided. The computer readable storage medium stores an instruction, and when the instruction is run on a computer, the computer is enabled to perform the method according to any one of the foregoing aspects.

According to a seventh aspect, a computer program product including an instruction is provided. When the computer program product runs on a computer, the computer is enabled to perform the method according to any one of the foregoing aspects.

According to an eighth aspect, a communications apparatus (for example, the communications apparatus may be a chip or a chip system) is provided. The communications apparatus includes a processor, configured to implement the function in any one of the foregoing aspects. In a possible design, the communications apparatus further includes a memory. The memory is configured to store a necessary program instruction and necessary data. When the communications apparatus is a chip system, the chip system may include a chip, or may include a chip and another discrete device.

For technical effects brought by any one of the designs of the third aspect to the eighth aspect, refer to technical effects brought by different designs of the first aspect or the second aspect. Details are not described herein again.

According to a ninth aspect, a communication method is provided. The method includes: A session management function network element obtains a first packet detection rule PDR. The first PDR is used to detect a multicast packet, and the first PDR indicates to carry on matching another PDR. The session management function network element sends an N4 session identifier and the first PDR to a user plane function network element. The user plane function network element receives the N4 session identifier and the first PDR from the session management function network element, and configures the first PDR in an N4 session corresponding to the N4 session identifier. The user plane function network element receives the multicast packet, and matches the multicast packet with a PDR on the user plane function network element. The multicast packet includes a multicast address. If the multicast packet successfully matches the first PDR, the user plane function network element carries on matching the multicast packet with another PDR.

In a possible design, the method further includes: If packet duplication information corresponding to the first PDR matches sender information of the multicast packet, the user plane function network element duplicates the multicast packet, and processes a duplicated multicast packet according to a rule associated with the first PDR. Alternatively, if packet duplication information corresponding to the first PDR does not match sender information of the multicast packet, the user plane function network element skips a process of processing the multicast packet according to a rule associated with the first PDR.

In a possible design, the method further includes: If packet duplication skip information corresponding to the first PDR does not match sender information of the multicast packet, the user plane function network element duplicates the multicast packet, and processes a duplicated multicast packet according to a rule associated with the first PDR. Alternatively, if packet duplication skip information corresponding to the first PDR matches sender information of the multicast packet, the user plane function network element skips a process of processing the multicast packet according to a rule associated with the first PDR.

In a possible design, that the user plane function network element matches the multicast packet with the PDR on the user plane function network element includes: The user plane function network element determines an N4 session that matches the multicast packet and that is on the user plane function network element, and the user plane function network element matches the multicast packet with each of PDRs in the N4 session in descending order of priorities of the PDRs.

In a possible design, that the user plane function network element matches the multicast packet with the PDR on the user plane function network element includes: The user plane function network element matches the multicast packet with each of PDRs on the user plane function network element in descending order of priorities of the PDRs.

In a possible design, the multicast packet is a broadcast packet, and correspondingly, the first PDR includes a broadcast address. The method further includes: The session management function network element determines a first N4 session that is corresponding to a group and that is on the user plane function network element. The broadcast packet belongs to the group, and the first N4 session is any one of all N4 sessions that are corresponding to the group and that are on the user plane function network element. Correspondingly, the N4 session identifier is an identifier of the first N4 session.

In a possible design, the multicast packet is a groupcast packet, and correspondingly, the first PDR includes a groupcast address. The method further includes: The session management function network element determines a second N4 session that is corresponding to a group and that is on the user plane function network element. The groupcast packet belongs to the group, and the second N4 session is any one of N4 sessions on the user plane function network element that are corresponding to the group and that support forwarding of the groupcast packet. Correspondingly, the N4 session identifier is an identifier of the second N4 session.

In a possible design, the first PDR includes a type indication, an indication to carry on matching, packet duplication information, or packet duplication skip information. The type indication, the indication to carry on matching, the packet duplication information, or the packet duplication skip information is used to indicate to carry on matching another PDR.

For technical effects of the ninth aspect, refer to the technical effects brought by any one of the possible designs of the first aspect or the second aspect. Details are not described herein again.

According to a tenth aspect, a communications system is provided. The communications system includes a session management function network element and a user plane function network element. The session management function network element is configured to obtain a first packet detection rule PDR. The first PDR is used to detect a multicast packet, and the first PDR indicates to carry on matching another PDR. The session management function network element is further configured to send an N4 session identifier and the first PDR to the user plane function network element. The user plane function network element is configured to: receive the N4 session identifier and the first PDR from the session management function network element, and configure the first PDR in an N4 session corresponding to the N4 session identifier. The user plane function network element is further configured to: receive the multicast packet, and match the multicast packet with a PDR on the user plane function network element. The multicast packet includes a multicast address. The user plane function network element is further configured to: if the multicast packet successfully matches the first PDR, carry on matching the multicast packet with another PDR.

In a possible design, the user plane function network element is further configured to: if packet duplication information corresponding to the first PDR matches sender information of the multicast packet, duplicate the multicast packet, and process a duplicated multicast packet according to a rule associated with the first PDR. Alternatively, the user plane function network element is further configured to: if packet duplication information corresponding to the first PDR does not match sender information of the multicast packet, skip a process of processing the multicast packet according to a rule associated with the first PDR.

In a possible design, the user plane function network element is further configured to: if packet duplication skip information corresponding to the first PDR does not match sender information of the multicast packet, duplicate the multicast packet, and process a duplicated multicast packet according to a rule associated with the first PDR. Alternatively, the user plane function network element is further configured to: if packet duplication skip information corresponding to the first PDR matches sender information of the multicast packet, skip a process of processing the multicast packet according to a rule associated with the first PDR.

In a possible design, that the user plane function network element is configured to match the multicast packet with the PDR on the user plane function network element includes: The user plane function network element is configured to: determine an N4 session that matches the multicast packet and that is on the user plane function network element, and match the multicast packet with each of PDRs in the N4 session in descending order of priorities of the PDRs.

In a possible design, that the user plane function network element is configured to match the multicast packet with the PDR on the user plane function network element includes: The user plane function network element is configured to match the multicast packet with each of PDRs on the user plane function network element in descending order of priorities of the PDRs.

In a possible design, the multicast packet is a broadcast packet, and correspondingly, the first PDR includes a broadcast address. The session management function network element is further configured to: determine a first N4 session that is corresponding to a group and that is on the user plane function network element. The broadcast packet belongs to the group, and the first N4 session is any one of all N4 sessions that are corresponding to the group and that are on the user plane function network element. Correspondingly, the N4 session identifier is an identifier of the first N4 session.

In a possible design, the multicast packet is a groupcast packet, and correspondingly, the first PDR includes a groupcast address. The session management function network element is further configured to determine a second N4 session that is corresponding to a group and that is on the user plane function network element. The groupcast packet belongs to the group, and the second N4 session is any one of N4 sessions on the user plane function network element that are corresponding to the group and that support forwarding of the groupcast packet. Correspondingly, the N4 session identifier is an identifier of the second N4 session.

In a possible design, the first PDR includes a type indication, an indication to carry on matching, packet duplication information, or packet duplication skip information. The type indication, the indication to carry on matching, the packet duplication information, or the packet duplication skip information is used to indicate to carry on matching another PDR.

For technical effects of the tenth aspect, refer to the technical effects brought by any one of the possible designs of the first aspect or the second aspect. Details are not described herein again.

DETAILED DESCRIPTION OF ILLUSTRATIVE EMBODIMENTS

For ease of understanding of technical solutions in embodiments of this application, the following first briefly describes technologies related to this application.

1.5G Virtual Network (5G Virtual Network, 5G VN):

A 5G VN service is a service provided by a current 5G network, and is mainly used in home communication, enterprise office, factory manufacturing, internet of vehicles, power grid reconstruction, a public security organization, and the like. The 5G VN service can provide private communications of an internet protocol (IP) type or a non-IP type (for example, an Ethernet type) for two or more terminal devices in a group. For example, devices in a factory may constitute a group, and the devices in the group may send an Ethernet data packet to each other. Alternatively, office devices (such as mobile phones, computers, or laptop computers) of employees in a department of an enterprise may constitute a group, and the office devices send an IP packet to each other. If two terminal devices are not in a same group, the two terminal devices cannot communicate with each other.

Figure 1:
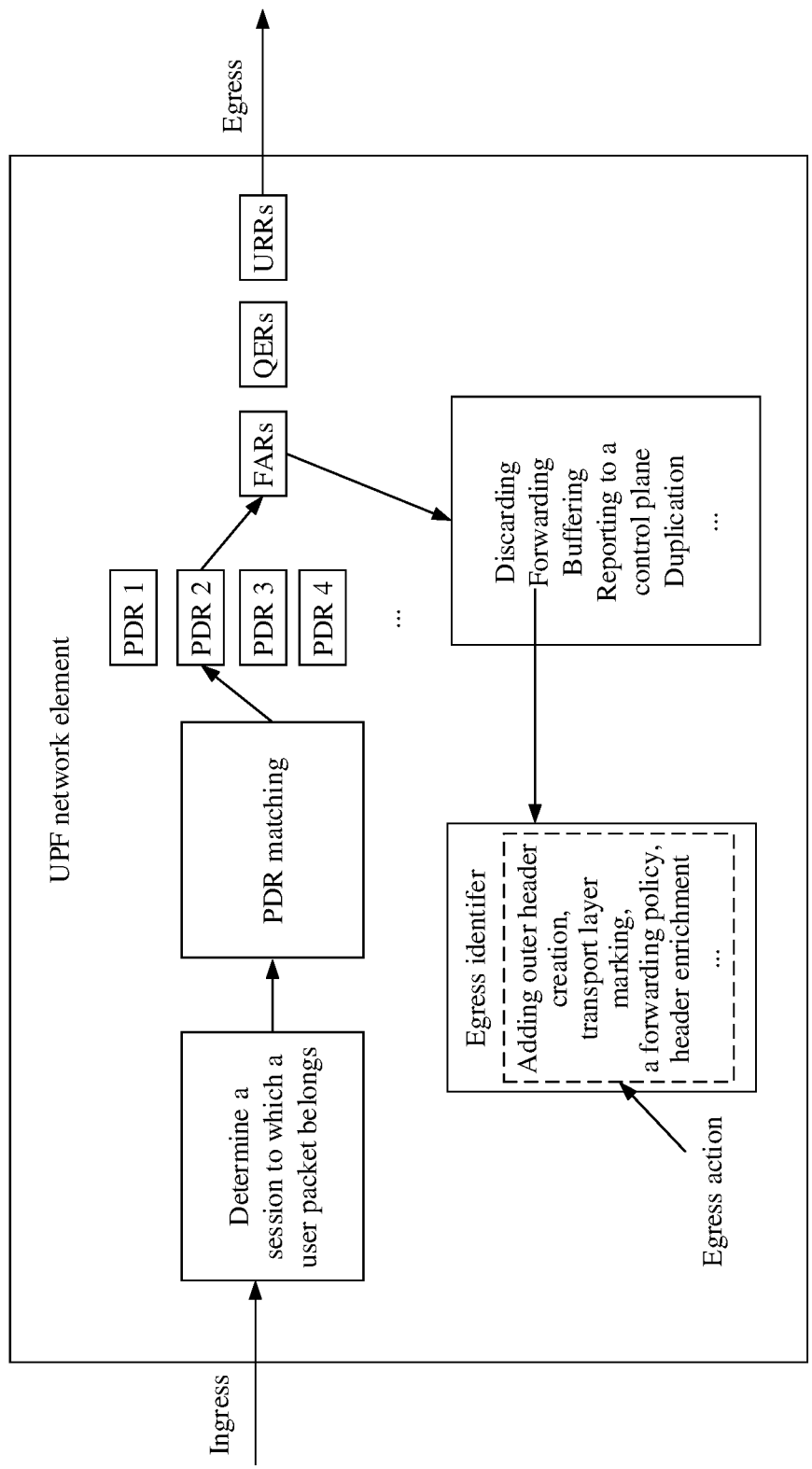
FIG. 1 is a schematic flowchart of forwarding a packet on a user plane defined in existing 3GPP TS29.244.
Figure 2A:
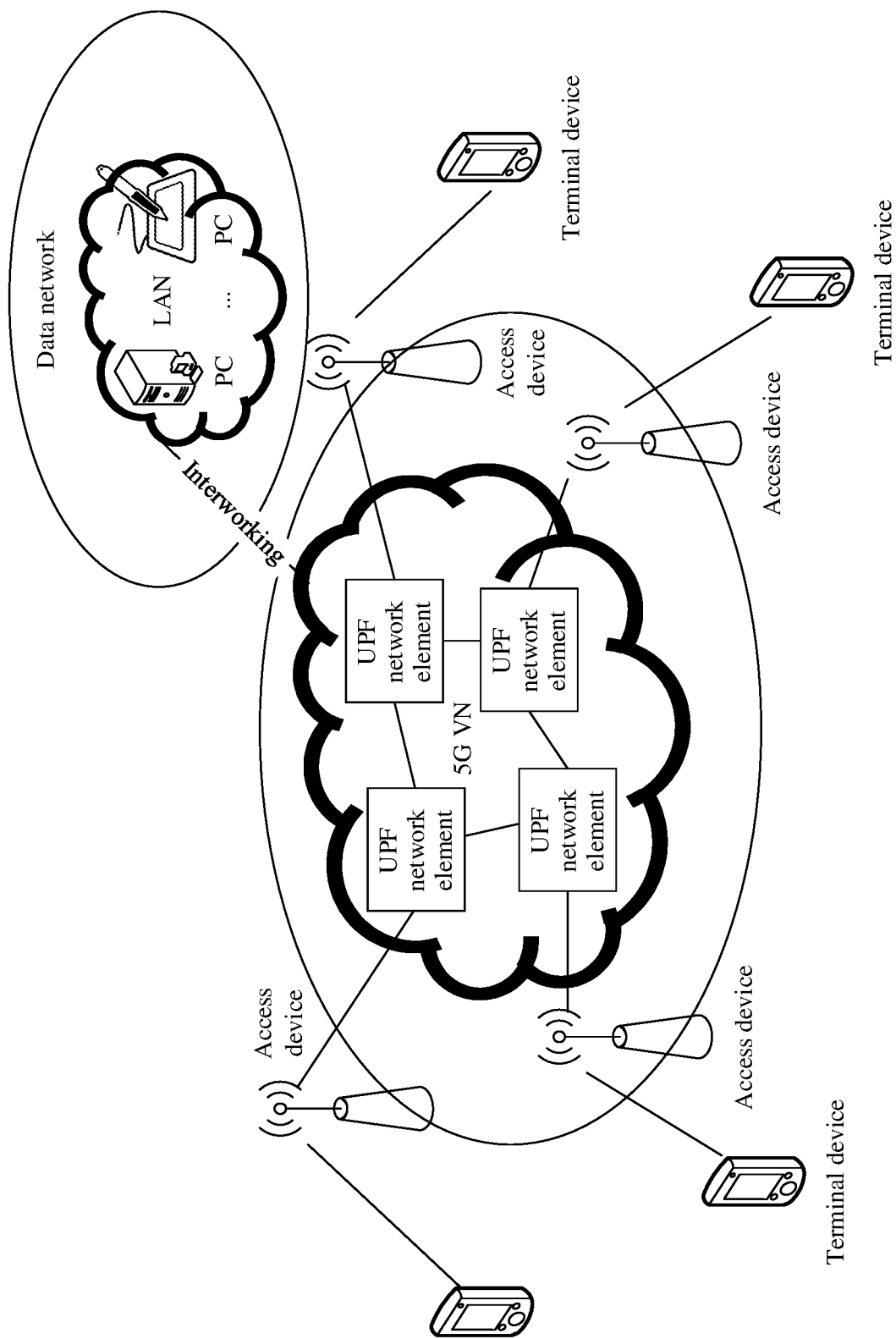
FIG. 2a is a schematic diagram of a user plane architecture of an existing 5G VN service.

FIG. 2a is a schematic diagram of a user plane architecture of an existing 5G VN service. A terminal device establishes a session on a UPF network element that provides the 5G VN service, to access the UPF network element that provides the 5G VN service. The UPF network element that provides the 5G VN service may interwork with an existing local area network (LAN) in a data network (DN) through an N6 interface, for example, communicate with a personal computer (PC) in the LAN. Alternatively, the UPF network element that provides the 5G VN service may associate sessions of different terminal devices through an internal interface of the UPF network element or a connection between UPF network elements, to implement private communication. This is not specifically limited in the embodiments of this application.

In terms of expression, 5G VNs may also be referred to as a 5G VN group, 5G local area networks (5GLAN), a 5G LAN group, local area networks (LAN), a 5G LAN-VN LAN group, LAN-type services (type service), LAN-VNs, 5G LAN-type services (type service), or the like. A name of the 5G VN is not specifically limited in the embodiments of this application.

2. Broadcast:

Broadcast is a one-to-many communication mode. On a network, one local area network (for example, a 5G VN) corresponds to one broadcast domain. Terminal devices subscribed to the LAN may constitute a broadcast group (which may also be referred to as a LAN group). The terminal device subscribed to the LAN may be referred to as a terminal member of the broadcast group. In other words, the terminal device joins the broadcast group (the terminal device may join one or more broadcast groups) in a subscription process. For related implementation, refer to an existing solution. Details are not described herein.

Figure 2B:
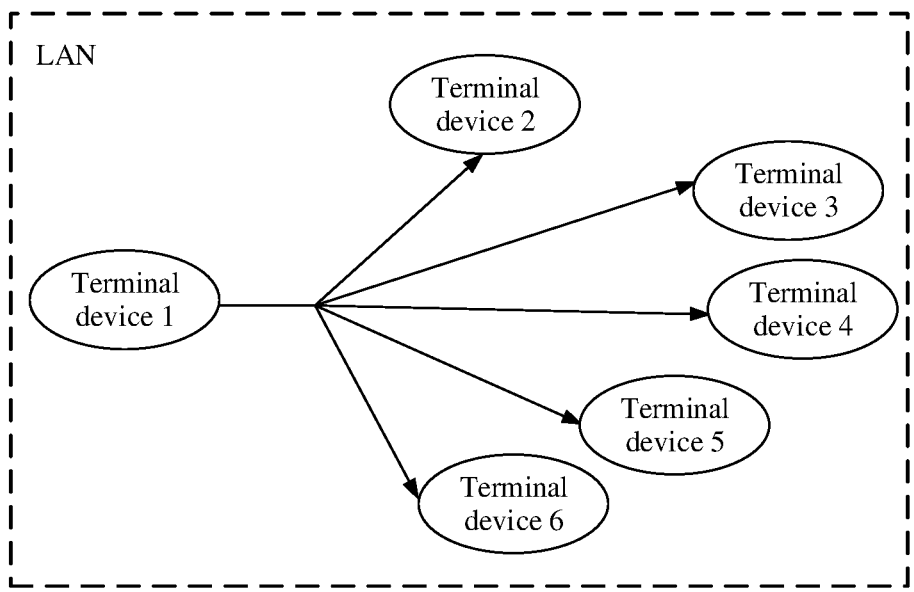
FIG. 2b is a schematic diagram of communication in an existing broadcast scenario.

Any terminal device that has accessed a network in the broadcast group may serve as a broadcast source to send a broadcast packet, and may also serve as a broadcast member to receive a broadcast packet. For example, it is assumed that terminal members that have accessed a network in the broadcast group include a terminal device 1, a terminal device 2, a terminal device 3, a terminal device 4, a terminal device 5, and a terminal device 6. For example, the terminal device 1 serves as a broadcast source. A corresponding schematic diagram of communication may be shown in FIG. 2b. To be specific, a broadcast packet sent by the terminal device 1 may be transmitted to the terminal device 2, the terminal device 3, the terminal device 4, the terminal device 5, and the terminal device 6 in the broadcast group.

It should be noted that, in the embodiments of this application, that a terminal member in the broadcast group accesses a network means establishing a user plane connection. A typical network access manner is that the terminal device initiates a packet data unit (PDU) session establishment request. For details, refer to an existing implementation. Details are not described herein.

A broadcast address in the embodiments of this application may be a destination IP address that is all 1s, for example, 255.255.255.255. Alternatively, the broadcast address in the embodiments of this application may be a destination media access control (MAC) address that is all 1s, for example, 0xff: 0xff: 0xff: 0xff: 0xff: 0xff. Alternatively, the broadcast address in the embodiments of this application may be a broadcast address of a subnet. For details, refer to an existing definition of the broadcast address. Details are not described herein.

Figure 2C:
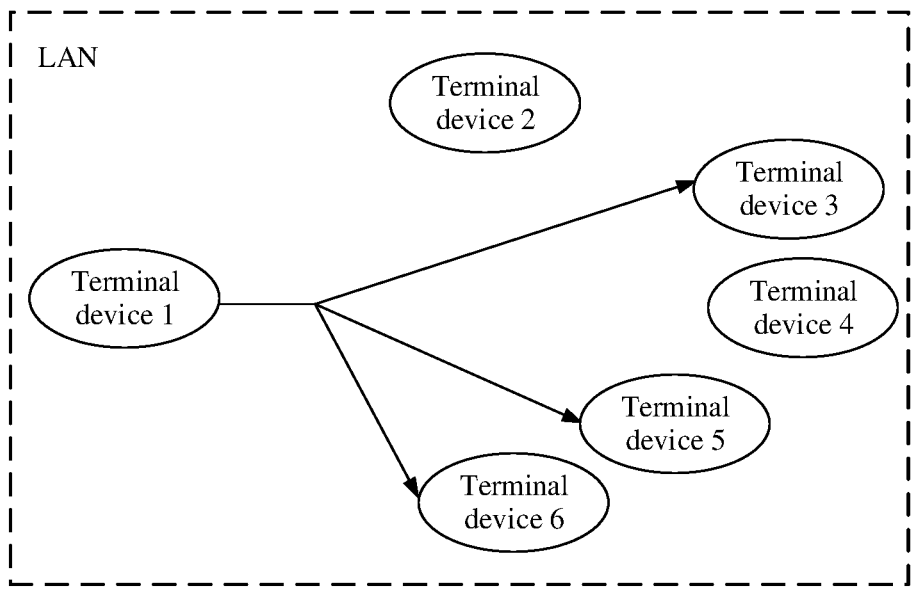
FIG. 2c is a schematic diagram of communication in an existing groupcast scenario.

3. Groupcast:

In the embodiments of this application, one groupcast source and a plurality of groupcast members may constitute one groupcast group (which may also be referred to as a groupcast group for short). A source that sends an IP packet with an address of the groupcast group as a destination address is referred to as a groupcast source, and a groupcast user that receives groupcast data is referred to as a groupcast member. In other words, groupcast has a direction, and the direction is from a groupcast source to groupcast members. Roles of the groupcast source and the groupcast group members are not interchangeable. Otherwise, the groupcast source and the groupcast group members belong to different groupcast groups. For example, it is assumed that terminal members in the LAN group include a terminal device 1, a terminal device 2, a terminal device 3, a terminal device 4, a terminal device 5, and a terminal device 6. For example, the terminal device 1 serves as a groupcast source, and the terminal device 3, the terminal device 5, and the terminal device 6 serve as groupcast members to constitute a groupcast group. A corresponding schematic diagram of communication may be shown in FIG. 2c. To be specific, a groupcast packet sent by the terminal device 1 may be transmitted to the terminal device 3, the terminal device 5, and the terminal device 6 in the groupcast group.

In the embodiments of this application, the groupcast source is determined by an application layer of an open systems interconnection (OSI) model. If the terminal device needs to receive a groupcast packet, the terminal device may explicitly send an internet group management protocol (IGMP) join message to a network. Only after recording that the terminal device joins a groupcast group, the network forwards, to the terminal device, a groupcast packet sent by the groupcast source. In other words, the groupcast member dynamically joins the groupcast group. For details, refer to an existing implementation, and details are not described herein again.

The groupcast address in the embodiments of this application may be a groupcast IP version 4 (IPv4) address assigned by the internet assigned numbers authority (IANA), and ranges from 224.0.0.0 to 239.255.255.255. Alternatively, the groupcast address in the embodiments of this application may be a groupcast MAC address whose last bit in most significant 24 bits in 48 bits is always 1. Alternatively, the groupcast address in the embodiments of this application may be a reserved groupcast address, for example, a groupcast MAC address whose most significant 24 bits are 0x01005e or 224.0.0.1. Alternatively, the groupcast address in the embodiments of this application may be another address. For details, refer to an existing definition of the groupcast address. Details are not described herein.

4. Multicast:

Multicast in the embodiments of this application includes the foregoing broadcast or groupcast. If the multicast includes the foregoing broadcast, a corresponding multicast address may be referred to as a broadcast address, and a corresponding multicast packet may be referred to as a broadcast packet. Alternatively, if the multicast includes the foregoing groupcast, a corresponding multicast address may be referred to as a groupcast address, and a corresponding multicast packet may be referred to as a groupcast packet. A general description is provided herein, and details are not described below again.

5. N4 Session:

The N4 session in the embodiments of this application includes a user-level N4 session and a group-level N4 session. In the current 5G network, the N4 session is created by a session management function (SMF) network element on the UPF network element.

For example, the user-level N4 session on the UPF network element may be specifically an N4 session that is created, when the terminal device establishes a PDU session, by the SMF network element on the UPF network element and that is corresponding to the PDU session. A function of the N4 session is follows: The UPF network element receives, through the user-level N4 session, a packet (for example, a broadcast packet or a groupcast packet) sent by the terminal device, and the UPF network element sends a packet (for example, a broadcast packet or a groupcast packet) to the terminal device through the user-level N4 session.

In an example, when the terminal device establishes a PDU session, the SMF network element may indicate the UPF network element to create an N4 session (namely, the user-level N4 session) corresponding to the PDU session. When receiving a request for deleting the PDU session of the terminal device, the SMF network element triggers the UPF network element to delete the N4 session corresponding to the PDU session. In the embodiments of this application, one UPF network element may include one or more N4 sessions corresponding to a PDU session or PDU sessions. For example, if a plurality of terminal devices are connected to a same UPF network element, the UPF network element needs to create an N4 session corresponding to a PDU session of each terminal device.

Figure 3A:
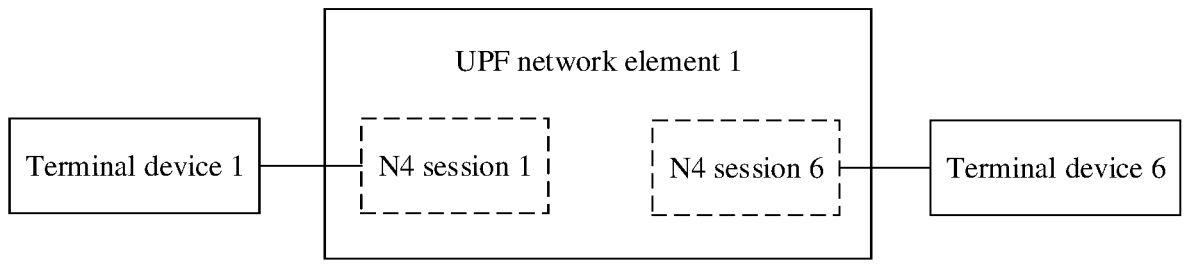
FIG. 3a is a schematic diagram of a user-level N4 session according to an embodiment of this application.

For example, in FIG. 3a, a terminal device 1 and a terminal device 6 are connected to a UPF network element 1. In this case, when creating a PDU session of the terminal device 1, the SMF network element may indicate the UPF network element 1 to create an N4 session 1 corresponding to the PDU session of the terminal device 1. When creating a PDU session of the terminal device 6, the SMF network element may indicate the UPF network element 1 to create an N4 session 6 corresponding to the PDU session of the terminal device 6.

For ease of description, in the embodiments of this application, the N4 session corresponding to the PDU session of the terminal device 1 may be referred to as an N4 session of the terminal device 1, the N4 session corresponding to the PDU session of the terminal device 6 may be referred to as an N4 session of the terminal device 6, and so on. A general description is provided herein, and details are not described below again.

Alternatively, to support communication between different UPF network elements and communication between a UPF network element and a DN in the 5G VN service, the SMF network element further needs to create, on each UPF network element that provides the 5G VN service, a group-level N4 session for a corresponding 5G VN group.

In an example, when creating a first PDU session anchored on the UPF network element in the 5G VN group, the SMF network element may indicate the UPF network element to create a group-level N4 session corresponding to the 5G VN group. In addition, when releasing a last PDU session anchored on the UPF network element in the 5G VN group, the SMF network element may indicate the UPF network element to delete a group-level N4 session corresponding to the 5G VN group. In the embodiments of this application, one UPF network element may include one or more group-level N4 sessions. For example, if one UPF network element serves a plurality of 5G VN groups, the UPF network element needs to create a plurality of group-level N4 sessions, where each N4 session is corresponding to one 5G VN group. In the embodiments of this application, a plurality of group-level N4 sessions may be created for one 5G VN group.

Figure 3B:
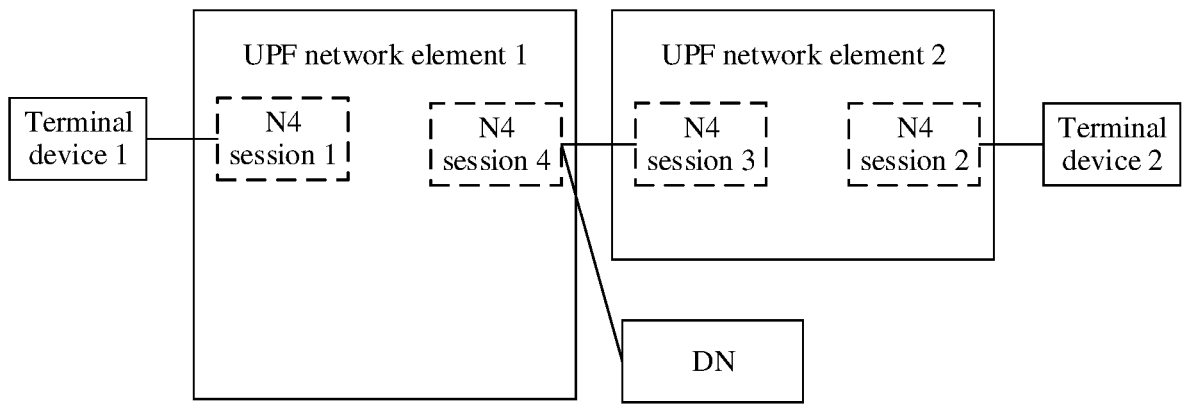
FIG. 3b is a schematic diagram of a group-level N4 session according to an embodiment of this application.

For example, as shown in FIG. 3b, it is assumed that when creating a PDU session of a terminal device 1, the SMF network element has indicated a UPF network element 1 to create an N4 session 1 corresponding to the PDU session of the terminal device 1. Then, when creating a PDU session of a terminal device 2, the SMF network element may indicate a UPF network element 2 to create an N4 session 2 corresponding to the PDU session of the terminal device 2. In addition, because the terminal device 1 in the 5G VN group has accessed the UPF network element 1, the SMF network element needs to indicate the UPF network element 2 to create a group-level N4 session 3 corresponding to the 5G VN group, and the SMF network element indicates the UPF network element 1 to create a group-level N4 session 4 corresponding to the 5G VN group. Alternatively, optionally, if the 5G VN group needs to communicate with the DN, the SMF network element may indicate the UPF network element 1 to create a group-level N4 session 4 corresponding to the 5G VN group. This is not specifically limited herein.

6. Routing Rule:

The N4 session in the embodiments of this application includes a routing rule, and the routing rule is used to detect a data packet and forward the data packet. When indicating the UPF network element to create an N4 session, the SMF network element may configure a corresponding routing rule for the N4 session. A routing rule in a user-level N4 session may be used to detect and forward a data packet related to a PDU session of the terminal device. A routing rule in a group-level N4 session is used to detect and forward a data packet that is related to an N19 tunnel or an N6 interface and that belongs to the 5G VN group.

It should be noted that a data packet and a packet in the embodiments of this application have a same meaning, and are interchangeable. A general description is provided herein, and details are not described below again.

It should be noted that, in the embodiments of this application, an internal interface of the UPF network element is a virtual port or a specific port on the UPF network element, and is used by the UPF network element to locally forward a received data packet. That the data packet is locally forwarded to the internal interface of the UPF network element means that the UPF network element receives the data packet again through the internal interface, so that the data packet is detected again by the UPF network element, to match a corresponding routing rule, and be forwarded along a correct path. Before re-detection, the UPF network element may decapsulate an external tunnel header for the data packet. Optionally, new external tunnel header information may be re-encapsulated for the data packet. The new tunnel information may be included in a FAR in the routing rule, or may be generated by the UPF network element based on forwarding indication information in a FAR. This is not specifically limited herein.

It should be noted that, in the embodiments of this application, there may be one or more groups of routing rules in the N4 session, and each group of routing rules include a PDR and a FAR associated with the PDR. Optionally, each group of routing rules may further include a QER and a URR associated with the PDR. A general description is provided herein, and details are not described below again. A possible type of the PDR included in the routing rules is unicast, and this type of PDR is used to detect a unicast packet. Another possible type of the PDR included in the routing rules is multicast, and this type of PDR is used to detect a multicast packet. For related descriptions, refer to subsequent embodiments. Details are not described herein.

PDRs in the embodiments of this application may include an uplink (UL) PDR and a downlink (DL) PDR. Correspondingly, a FAR, a QER, and a URR associated with the UL PDR may be respectively referred to as a UL FAR, a UL QER, and a UL URR. A FAR, a QER, and a URR associated with the DL PDR may be respectively referred to as a DL FAR, a DL QER, and a DL URR. A general description is provided herein, and details are not described below again.

Figure 4:
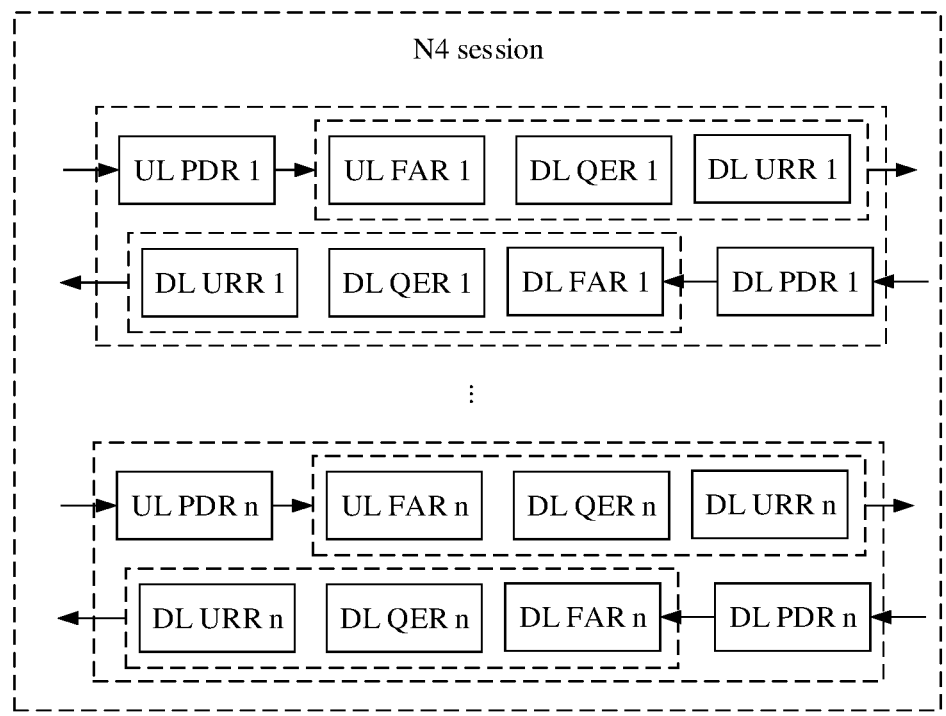
FIG. 4 is a schematic structural diagram of an N4 session according to an embodiment of this application.

For example, as shown in FIG. 4, the N4 session may include a UL PDR 1, and a UL FAR 1, a UL QER 1, and a UL URR 1 that are associated with the UL PDR 1; a DL PDR 1, and a DL FAR 1, a DL QER 1, and a DL URR 1 that are associated with the DL PDR 1; . . . , a UL PDR n, and a UL FAR n, a UL QER n, and a UL URR n that are associated with the UL PDR n; and a DL PDR n, and a DL FAR n, a DL QER n, and a DL URR n that are associated with the DL PDR n.

The following further describes the routing rule in the user-level N4 session and the routing rule in the group-level N4 session.

Case 1: For the User-Level N4 Session:

An existing UL PDR is used to detect a unicast packet and a multicast packet received from a PDU session tunnel, and may specifically include a source interface parameter, a tunnel information parameter, network instance information, and a filter parameter or an address of a terminal device. The source interface parameter is set to "access side" or "core side". The tunnel information parameter is set to a tunnel general packet radio service (GPRS) tunneling protocol-user plane (GPRS tunneling protocol user, GTP-U) TEID of the PDU session on the UPF network element side. The network instance information is set to a value corresponding to the 5G VN group. In the filter parameter, for example, an address of the terminal device may be used as a source address. The address of the terminal device may include, for example, an IP address or a MAC address. A general description is provided herein, and details are not described below again.

A UL FAR associated with the UL PDR includes network instance information and a destination interface parameter, and is used to transmit a data packet that matches the UL PDR to a destination interface. The SMF network element sets the network instance information to a value corresponding to the 5G VN group, and sets a value of the destination interface parameter to a value (for example, "5G VN internal") corresponding to the internal interface of the UPF network element. It may be understood that the UL FAR in the user-level N4 session is used to locally forward, to the internal interface of the UPF network element, a data packet that is received from the PDU session tunnel and that matches the UL PDR in the N4 session.

An existing DL PDR is used to detect a unicast packet received from the internal interface, and specifically includes a source interface parameter, network instance information, and a filter parameter or the address of the terminal device. The source interface parameter is set to "5G VN internal". The network instance information is set to a value corresponding to the 5G VN group. In the filter parameter, for example, the address of the terminal device may be used as a destination address.

A DL FAR associated with the DL PDR includes network instance information, a destination interface parameter, and/or an external tunnel parameter, and is used to transmit, to a destination interface, a data packet that is received from the internal interface and that matches the DL PDR. The network instance information is set to a value corresponding to the 5G VN group. A value of the destination interface parameter is set to "access side" or "core side". A value of the external tunnel parameter is set to tunnel information (for example, a general packet radio service (GPRS) tunneling protocol-user plane (GPRS tunneling protocol user, GTP-U) TEID of a PDU session on an access device or the UPF network element) of the PDU session. It may be understood that the DL FAR in the N4 session corresponding to the PDU session is used to transmit, to a specified PDU session tunnel, a data packet that is received from the internal interface and that matches the DL PDR in the N4 session.

However, in the embodiments of this application, a DL PDR of a multicast type is introduced. The DL PDR is used to detect a multicast packet received from the internal interface, and may specifically include a source interface parameter, a filter parameter, network instance information, and indication information. The source interface parameter is set to "5G VN internal". The network instance information is set to a value corresponding to the 5G VN group. In the filter parameter information, a broadcast address or a groupcast address specified by the SMF network element is used as a destination address. The indication information may include one or more of a type indication, an indication to carry on matching, packet duplication information, or packet duplication skip information. For example, the indication information includes the packet duplication information and the type indication. Alternatively, the indication information includes the packet duplication information and the indication to carry on matching. Alternatively, the indication information includes the packet duplication skip information and the type indication. Alternatively, the indication information includes the packet duplication skip information and the indication to carry on matching. This is not specifically limited in the embodiments of this application. For related descriptions of the DL FAR associated with the DL PDR, refer to the foregoing descriptions of the DL FAR associated with the DL PDR that is used to detect a unicast packet. Details are not described herein again.

Case 2: For the Group-Level N4 Session:

An existing UL PDR is used to detect a unicast packet received from the internal interface, and may specifically include a source interface parameter, network instance information, and a filter parameter. The source interface parameter is set to "5G VN internal". The network instance information is set to a value corresponding to the 5G VN group. In the filter parameter, for example, an address of the terminal device may be used as a destination address.

A UL FAR associated with the UL PDR includes network instance information, a destination interface parameter, and/or an external tunnel parameter, and is used to forward, to a destination interface, a data packet that is received from the internal interface and that matches the UL PDR. The network instance information is set to a value corresponding to the 5G VN group. A value of the destination interface parameter is set to "core side". A value of the external tunnel parameter is set to information about an N19 tunnel (for example, a GTP-U TEID of an N19 tunnel connecting the current UPF network element to another UPF network element). It may be understood that the UL FAR in the group-level N4 session is used to forward a data packet that matches the UL PDR in the group-level N4 session to the N19 tunnel connecting the UPF network element to the another UPF network element or an N6 interface connecting the UPF network element to a DN.

However, in the embodiments of this application, a UL PDR of a multicast type is introduced. The UL PDR is used to detect a multicast packet received from the internal interface, and may specifically include a source interface parameter, network instance information, a filter parameter, and indication information. The source interface parameter is set to "5G VN internal". The network instance information is set to a value corresponding to the 5G VN group. In the filter parameter information, a broadcast address or a groupcast address specified by the SMF network element is used as a destination address. The indication information may include one or more of a type indication, an indication to carry on matching, packet duplication information, or packet duplication skip information. For example, the indication information includes the packet duplication information and the type indication. Alternatively, the indication information includes the packet duplication information and the indication to carry on matching. Alternatively, the indication information includes the packet duplication skip information and the type indication. Alternatively, the indication information includes the packet duplication skip information and the indication to carry on matching. This is not specifically limited in the embodiments of this application. For related descriptions of the UL FAR associated with the UL PDR, refer to the foregoing descriptions of the UL FAR associated with the UL PDR that is used to detect a unicast packet. Details are not described herein again.

An existing DL PDR is used to detect a unicast packet or a multicast packet received from an N19 tunnel or an N6 interface, and specifically includes a source interface parameter, network instance information, and/or a tunnel information parameter. The source interface parameter is set to "5G VN internal". The network instance information is set to a value corresponding to the 5G VN group. The tunnel information parameter is set to a GTP-U TEID of the N19 tunnel on the UPF network element side.

A DL FAR associated with the DL PDR includes a destination interface parameter, and is used to transmit, to a destination interface, a data packet that is received from the N19 tunnel or the N6 interface and that matches the DL PDR. The SMF network element sets a value of the destination interface parameter to a value (for example, "5G VN internal") corresponding to the internal interface of the UPF network element. It may be understood that the DL FAR in the group-level N4 session is used to locally forward a data packet that matches the DL PDR in the group-level N4 session to the internal interface of the UPF network element.

However, in the embodiments of this application, a DL PDR of a multicast type is introduced. The DL PDR is used to detect a multicast packet received from the N19 tunnel or the N6 interface, and may specifically include a source interface parameter, network instance information, a filter parameter, and/or a tunnel information parameter. The source interface parameter is set to "N6 LAN" or "core side". The network instance information is set to a value corresponding to the 5G VN group. In the filter parameter, a broadcast address or a groupcast address specified by the SMF network element is used as a destination address. The tunnel information parameter is set to a GTP-U TEID of the N19 tunnel on the UPF network element side. For related descriptions of the DL FAR associated with the DL PDR, refer to the foregoing descriptions of the DL FAR associated with the DL PDR that is used to detect a unicast packet. A difference lies in, for example, that the DL FAR associated with the DL PDR of a multicast type is used to locally forward, to the internal interface of the UPF network element, a data packet that matches the DL PDR in the group-level N4 session, together with N19 indication information or N6 indication information. Details are not described herein again. For example, the N19 indication information in the embodiments of this application may be, the GTP-U TEID of the N19 tunnel connecting the current UPF network element to the another UPF network element, and the N6 indication information in the embodiments of this application may be, for example, information about the N6 interface.

In addition, for related descriptions of the N4 session corresponding to the PDU session and the group-level N4 session, the UL QER and the UL URR that are associated with the UL PDR, and the DL QER and the DL URR that are associated with the DL PDR, refer to the prior art. Details are not described herein.

7. Process of Matching a Data Packet with a PDR:

In the prior art, after receiving a data packet, the UPF network element detects the data packet, and determines that the data packet matches a PDR (In other words, the data packet successfully matches the PDR, or the PDR successfully matches the data packet). Specifically, the following four matching processes are included:

(1) The data packet is detected based on PDU session tunnel information, network instance information, interface information, and/or header information of the data packet. If the PDU session tunnel information, the network instance information, the interface information, and/or the header information of the data packet respectively match/matches corresponding parameters/a corresponding parameter in a UL PDR of an N4 session corresponding to a PDU session, the UL PDR of the N4 session corresponding to the PDU session successfully matches the data packet.

(2) The data packet is detected based on interface information, network instance information, and header information of the data packet. If the interface information, the network instance information, and the header information respectively match corresponding parameters in a DL PDR of an N4 session corresponding to a PDU session, the DL PDR of the N4 session corresponding to the PDU session successfully matches the data packet.

(3) The data packet is detected based on interface information, network instance information, and header information of the data packet. If the interface information, the network instance information, and the header information of the data packet respectively match corresponding parameters in a UL PDR of a group-level N4 session, the UL PDR of the group-level N4 session successfully matches the data packet.

(4) The data packet is detected based on interface information, network instance information, and/or N19 tunnel information of the data packet. If the interface information, the network instance information, and/or the tunnel information of the data packet respectively match/matches corresponding parameters/a corresponding parameter in a DL PDR of a group-level N4 session, the DL PDR of the group-level N4 session successfully matches the data packet.

In a specific implementation process, the UPF network element performs one or more of the foregoing four matching processes, to match the data packet with the PDR.

In the embodiments of this application, the foregoing parameter-related matching are performed. In addition, if the data packet includes a multicast address, only when the interface information, the network instance information, the multicast address in the header information of the data packet, and/or the N19 tunnel information of the data packet are/is respectively equal to corresponding parameters/a corresponding parameter in the PDR (including the UL PDR and the DL PDR), it is considered that the PDR successfully matches the data packet.

8. Configuring of a Routing Rule on the UPF Network Element:

When indicating the UPF network element to create an N4 session, the SMF network element may configure a corresponding routing rule for the N4 session.

Figure 5:
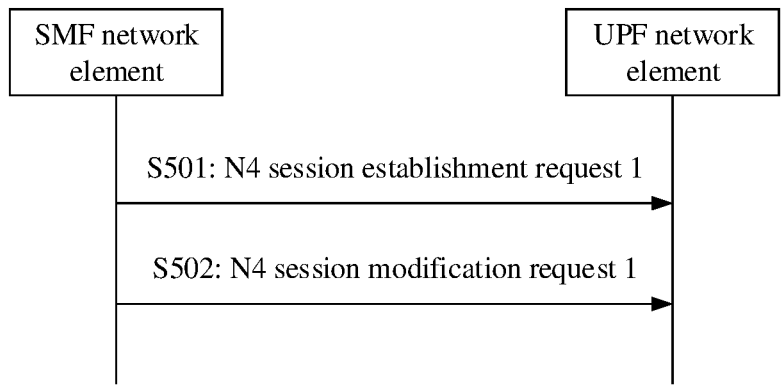
FIG. 5 is a schematic flowchart 1 of configuring a routing rule according to an embodiment of this application.

As shown in FIG. 5, the following steps are included for a user-level N4 session.

S501: When establishing a PDU session of a terminal device, the SMF network element determines an N4 session corresponding to a group to which the terminal device belongs, and then sends an N4 session establishment (N4 session establishment) request 1 to the UPF network element. The UPF network element receives the N4 session establishment request 1 from the SMF network element.

The N4 session establishment request 1 includes an N4 session identifier and a UL PDR that are corresponding to the N4 session, and is used to request to establish, on the UPF network element, an N4 session corresponding to the N4 session identifier.

The UL PDR includes an identifier of a rule associated with the UL PDR, and the rule associated with the UL PDR may include, for example, a UL FAR. Optionally, the rule associated with the UL PDR may further include a UL URR and a UL QER.

Optionally, if the UPF network element does not include the UL FAR corresponding to an identifier of the UL FAR, the UL URR corresponding to an identifier of the UL URR, or the UL QER corresponding to an identifier of the UL QER, the N4 session establishment request 1 may further include the UL FAR, the UL URR, or the UL QER associated with the UL PDR. This is not specifically limited herein.

S502: After receiving an access device side tunnel information of the PDU session of the terminal device, the SMF network element determines the N4 session corresponding to the group to which the terminal device belongs, and then sends an N4 session modification (N4 session modification) request 1 to the UPF network element. The UPF network element receives the N4 session modification request 1 from the SMF network element.

The N4 session modification request 1 includes the N4 session identifier and a DL PDR that are corresponding to the N4 session, and is used to request to modify, on the UPF network element, the N4 session corresponding to the N4 session identifier.

The DL PDR includes an identifier of a rule associated with the DL PDR, and the rule associated with the DL PDR may include, for example, a DL FAR. Optionally, the rule associated with the DL PDR may further include a DL URR and a DL QER.

Optionally, if the UPF network element does not include the DL FAR corresponding to an identifier of the DL FAR, the DL URR corresponding to an identifier of the DL URR, or the DL QER corresponding to an identifier of the DL QER, the N4 session modification request 1 may further include the DL FAR, the DL URR, or the DL QER associated with the DL PDR. This is not specifically limited herein.

Certainly, if the N4 session needs to be updated (for example, a routing rule needs to be added or a routing rule needs to be deleted) subsequently, the SMF network element may send an N4 session modification request to the UPF network element, to update the N4 session. Alternatively, when the SMF network element releases the PDU session of the terminal device, the SMF network element may send an N4 session release (N4 session release) request to the UPF network element. The N4 session release request is used to request the UPF network element to delete all contexts of the N4 session. This is not specifically limited in this embodiment of this application.

Figure 6:
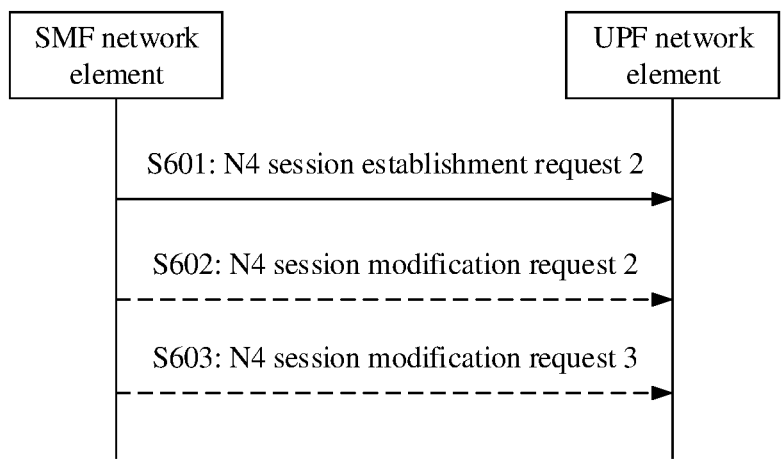
FIG. 6 is a schematic flowchart 2 of configuring a routing rule according to an embodiment of this application.

Alternatively, as shown in FIG. 6, the following steps are included for a group-level N4 session.

S601: When determining that the UPF network element provides a service for a 5G VN group for the first time, the SMF network element determines an N4 session corresponding to the 5G VN group, and then sends an N4 session establishment 2 to the UPF network element. The UPF network element receives the N4 session establishment request 2 from the SMF network element.

The N4 session establishment request 2 includes an N4 session identifier, a UL PDR, and a DL PDR that are corresponding to the N4 session, and is used to request to establish, on the UPF network element, an N4 session corresponding to the N4 session identifier.

The UL PDR includes an identifier of a rule associated with the UL PDR. The DL PDR includes an identifier of a rule associated with the DL PDR. For related descriptions of the rule associated with the UL PDR and the rule associated with the DL PDR, refer to the foregoing embodiment. Details are not described herein again.

Optionally, if the UPF network element does not include a UL FAR corresponding to an identifier of the UL FAR, a UL URR corresponding to an identifier of the UL URR, or a UL QER corresponding to an identifier of the UL QER, the N4 session establishment request 2 may further include the UL FAR, the UL URR, or the UL QER associated with the UL PDR. This is not specifically limited herein.

Optionally, if the UPF network element does not include a DL FAR corresponding to an identifier of the DL FAR, a DL URR corresponding to an identifier of the DL URR, or a DL QER corresponding to an identifier of the DL QER, the N4 session establishment request 2 may further include the DL FAR, the DL URR, or the DL QER associated with the DL PDR. This is not specifically limited herein.

S602: When determining that there is a new address of a terminal device and/or a new N19 tunnel in the 5G VN group, the SMF network element determines the N4 session corresponding to the 5G VN group, and then sends an N4 session modification request 2 to the UPF network element. The UPF network element receives the N4 session modification request 2 from the SMF network element.

The N4 session modification request 2 includes the N4 session identifier, the UL PDR, and the DL PDR that are corresponding to the N4 session. These routing rules are related to the new address of the terminal device and/or the new N19 tunnel.

The UL PDR includes the identifier of the rule associated with the UL PDR. The DL PDR includes the identifier of the rule associated with the DL PDR. For related descriptions of the rule associated with the UL PDR and the rule associated with the DL PDR, refer to the foregoing embodiment. Details are not described herein again.

Optionally, if the UPF network element does not include the UL FAR corresponding to the identifier of the UL FAR, the UL URR corresponding to the identifier of the UL URR, or the UL QER corresponding to the identifier of the UL QER, the N4 session modification request 2 may further include the UL FAR, the UL URR, or the UL QER associated with the UL PDR. This is not specifically limited herein.

Optionally, if the UPF network element does not include the DL FAR corresponding to the identifier of the DL FAR, the DL URR corresponding to the identifier of the DL URR, or the DL QER corresponding to the identifier of the DL QER, the N4 session modification request 2 may further include the DL FAR, the DL URR, or the DL QER associated with the DL PDR. This is not specifically limited herein.

S603: When determining to release an N19 tunnel or an address of the terminal device in the 5G VN group, the SMF network element determines the N4 session corresponding to the 5G VN group, and then sends an N4 session modification request 3 to the UPF network element. The UPF network element receives the N4 session modification request 3 from the SMF network element.

The N4 session modification request 3 includes the N4 session identifier, the UL PDR, and the DL PDR that are corresponding to the N4 session. These routing rules are related to the to-be-released address of the terminal device and/or the to-be-released N19 tunnel.

The UL PDR includes the identifier of the rule associated with the UL PDR. The DL PDR includes the identifier of the rule associated with the DL PDR. For related descriptions of the rule associated with the UL PDR and the rule associated with the DL PDR, refer to the foregoing embodiment. Details are not described herein again.

Optionally, if the UPF network element does not include the UL FAR corresponding to the identifier of the UL FAR, the UL URR corresponding to the identifier of the UL URR, or the UL QER corresponding to the identifier of the UL QER, the N4 session modification request 3 may further include the UL FAR, the UL URR, or the UL QER associated with the UL PDR. This is not specifically limited herein.

Optionally, if the UPF network element does not include the DL FAR corresponding to the identifier of the DL FAR, the DL URR corresponding to the identifier of the DL URR, or the DL QER corresponding to the identifier of the DL QER, the N4 session modification request 3 may further include the DL FAR, the DL URR, or the DL QER associated with the DL PDR. This is not specifically limited herein.

Certainly, if the N4 session needs to be updated (for example, a routing rule needs to be added or a routing rule needs to be deleted) subsequently, the SMF network element may send an N4 session modification request to the UPF network element, to update the N4 session. Alternatively, if the SMF network element determines to release a last PDU session in the 5G VN group on the UPF network element, the SMF network element may send an N4 session release request to the UPF network element. The N4 session release request is used to request the UPF network element to delete all contexts of the N4 session. This is not specifically limited in this embodiment of this application.

Optionally, in this embodiment of this application, if multicast is broadcast, the SMF network element needs to configure, for all user-level N4 sessions and one group-level N4 session that are corresponding to the group that are on the UPF network element, PDRs used to detect a broadcast packet. The PDRs of a broadcast type include: a UL PDR used to receive and process an uplink broadcast packet, and a DL PDR used to receive and process a downlink broadcast packet. The UL PDR includes an identifier of a rule associated with the UL PDR, and the DL PDR includes an identifier of a rule associated with the DL PDR. Certainly, if the SMF network element determines that the terminal device does not support forwarding of a broadcast packet, the SMF network element does not configure the PDR of a broadcast type for the user-level N4 session of the terminal device. Alternatively, if the SMF network element determines that the UPF network element does not support forwarding of a broadcast packet through an N6 tunnel or forwarding of a broadcast packet through the N19 tunnel, the SMF network element does not configure the PDR of a broadcast type for the group-level N4 session of the terminal device.

Alternatively, optionally, in this embodiment of this application, if multicast is groupcast, the SMF network element needs to configure PDRs of a groupcast type for all user-level N4 sessions and one group-level N4 session that are corresponding to the group and that support groupcast communication. The PDRs of a groupcast type include: a UL PDR used to receive and process an uplink groupcast packet, and a DL PDR used to receive and process a downlink groupcast packet. The UL PDR includes an identifier of a rule associated with the UL PDR, and the DL PDR includes an identifier of a rule associated with the DL PDR. Certainly, if the SMF network element determines that the UPF network element does not support forwarding of a groupcast packet through the N6 tunnel or forwarding of a groupcast packet through the N19 tunnel, the SMF network element does not configure the PDR of a groupcast type for the group-level N4 session of the terminal device.

In addition, in this embodiment of this application, if the SMF network element determines that the terminal device joins a groupcast group, the SMF network element may add the PDR of a groupcast type to the N4 session of the PDU session of the terminal device after determining a groupcast address of the groupcast group. Alternatively, if the SMF network element determines that the terminal device leaves a groupcast group, the SMF network element may delete the PDR of a groupcast type from the N4 session of the terminal device after determining a groupcast address of the groupcast group. These PDRs of a groupcast type include the groupcast address.

Optionally, the SMF network element may determine, in the following manners, that the terminal device joins/leaves a groupcast group:

The SMF network element receives a non-access stratum (NAS) request, for example, a PDU session establishment/modification message, from the terminal device, to determine that the terminal device joins/leaves a group.

Alternatively, the SMF network element receives an IGMP join/leave message from the UPF network element, to determine that the terminal device joins/leaves a group.

Alternatively, the SMF network element receives indication information, for example, a policy and charging control (policy control charge, PCC) rule or event subscription information, from a policy control function (PCF) network element/network exposure function (NEF) network element, to determine that the terminal device joins or leaves a group.

This embodiment of this application imposes no limitation on a manner of determining, by the SMF network element, that the terminal device joins/leaves a group.

The following describes the technical solutions in the embodiments of this application with reference to the accompanying drawings in the embodiments of this application. In the description of this application, "/" represents an "or" relationship between associated objects unless otherwise specified. For example, A/B may represent A or B. The term "and/or" in this application indicates only an association relationship for describing associated objects and indicates that three relationships may exist. For example, A and/or B may indicate the following three cases: Only A exists, both A and B exist, and only B exists, where A and B may be singular or plural. In addition, unless otherwise specified, "a plurality of" in the description of this application means two or more than two. The term "at least one piece (item) of the following" or a similar expression thereof indicates any combination of these items, including any combination of a singular item (piece) or plural items (pieces). For example, at least one (one piece) of a, b, or c may indicate: a, b, c, a-b, a-c, b-c, or a-b-c, where a, b, and c may be singular or plural. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" do not constitute a limitation on a quantity or an execution sequence, and that the terms such as "first" and "second" do not indicate a definite difference. In addition, in the embodiments of this application, a word such as "example" or "for example" is used to represent giving an example, an illustration, or a description. Any embodiment or design described as an "example" or "for example" in the embodiments of this application should not be explained as being more preferred or having more advantages than another embodiment or design. Exactly, the word such as "example" or "for example" is intended to present a related concept in a specific manner for ease of understanding.

The technical solutions provided in the embodiments of this application may be used in various communications systems, such as a long term evolution (LTE) system or a new radio (NR) system (which may also be referred to as a 5G system), or another new future-oriented system, for example, a programmable user plane system. This is not specifically limited in the embodiments of this application. In addition, the terms "system" and "network" are interchangeable.

Figure 7:
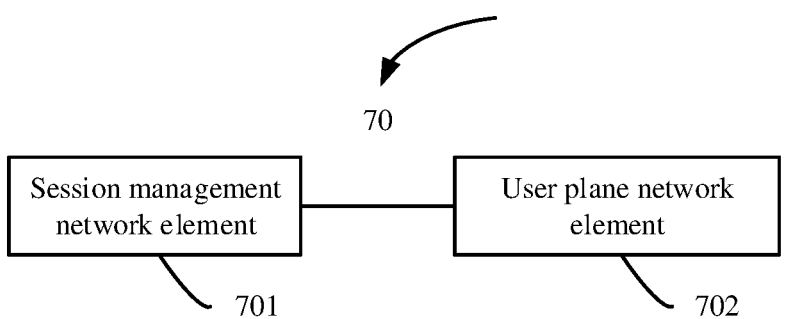
FIG. 7 is a schematic architectural diagram of a communications system according to an embodiment of this application.

FIG. 7 shows a communications system 70 according to an embodiment of this application. The communications system 70 includes a session management function network element 701 and a user plane function network element 702. The session management function network element 701 may directly communicate with the user plane function network element 702, or may communicate with the user plane function network element 702 through forwarding by another device. This is not specifically limited in this embodiment of this application.

The session management function network element 701 is configured to obtain a first PDR. The first PDR is used to detect a multicast packet, and the first PDR indicates to carry on matching another PDR. The session management function network element 701 is further configured to send an N4 session identifier and the first PDR to the user plane function network element 702. The user plane function network element 702 is configured to: receive the N4 session identifier and the first PDR from the session management function network element 701, and configure the first PDR in an N4 session, corresponding to the N4 session identifier, on the user plane function network element 702. The user plane function network element 702 is further configured to: receive the multicast packet, and match the multicast packet with a PDR on the user plane function network element 702, where the multicast packet includes a multicast address. The user plane function network element 702 is further configured to: if the multicast packet successfully matches the first PDR, carry on matching the multicast packet with another PDR. Specific implementation of the solution is described in detail in subsequent method embodiments. Details are not described herein.

Based on the communications system, in this embodiment of this application, routing rules configured by the session management function network element for the N4 session on the user plane function network element include the first PDR that is used to detect the multicast packet. After the multicast packet successfully matches the first PDR, the user plane function network element carries on matching the multicast packet with another PDR on the user plane function network element. In other words, the multicast packet received by the user plane function network element may match a plurality of PDRs, so that the multicast packet can be forwarded to a plurality of terminal devices according to rules (for example, FARs) associated with the plurality of PDRs. In this solution, when a terminal device member changes, the session management function network element does not need to perform excessive operations. Therefore, compared with a solution in which indication information in a FAR needs to be correspondingly updated when a terminal device member changes, this solution can improve efficiency of forwarding a multicast packet, reduce a signaling interaction procedure that is related to FAR updating and that is between the session management function network element and the user plane function network element, and reduce signaling overheads.

Optionally, the communications system 70 shown in FIG. 7 may be used in a current 5G network, another future network, or the like. This is not specifically limited in this embodiment of this application.

Figure 8:
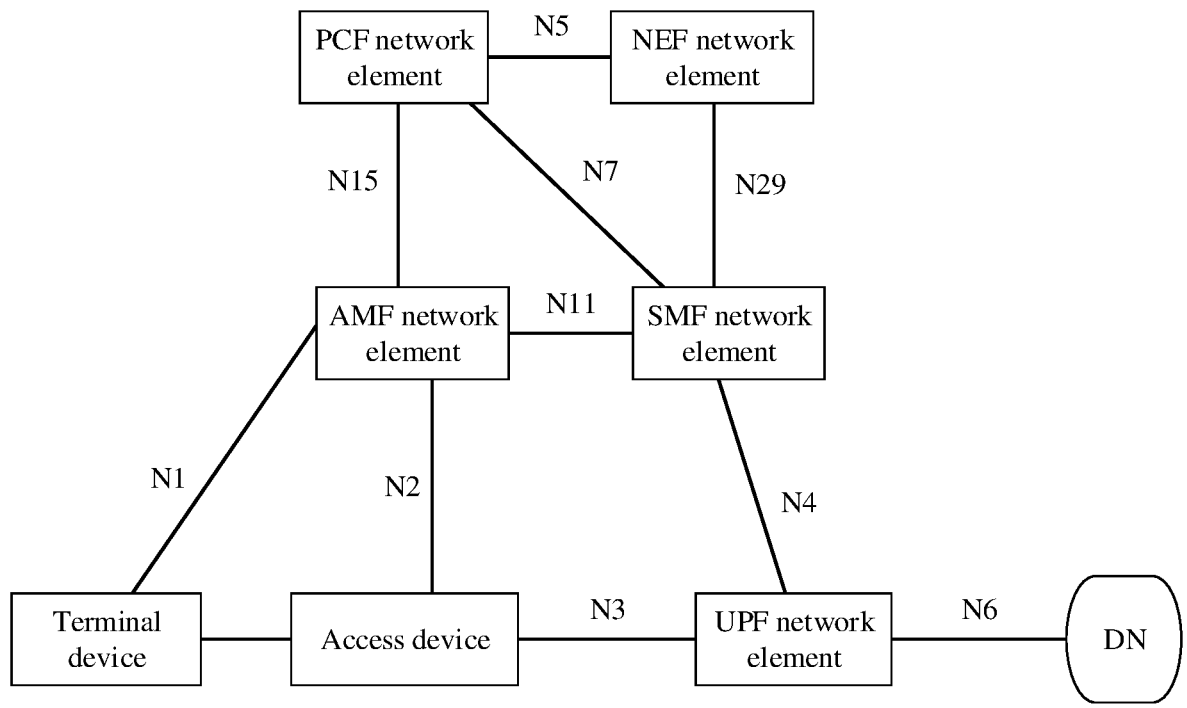
FIG. 8 is a schematic diagram of application of a communications system in a 5G network according to an embodiment of this application.

For example, it is assumed that the communications system 70 shown in FIG. 7 is used in the current 5G network. As shown in FIG. 8, a network element or an entity corresponding to the foregoing session management function network element may be an SMF network element in the 5G network, and a network element or an entity corresponding to the foregoing user plane function network element may be a UPF network element in the 5G network.

In addition, as shown in FIG. 8, the 5G network may further include an access device, a PCF network element, an NEF network element, an access and mobility management function (AMF) network element, and the like. This is not specifically limited in this embodiment of this application.

As shown in FIG. 8, a terminal device communicates with the AMF network element through a next generation (NG) 1 interface (N1 for short); the access device communicates with the AMF network element through an NG 2 interface (N2 for short); the access device communicates with the UPF network element through an NG 3 interface (N3 for short); the UPF network element communicates with a DN through an NG 6 interface (N6 for short); the AMF network element communicates with the SMF network element through an NG 11 interface (N11 for short); and the SMF network element communicates with the NEF network element through an NG 29 interface (N29 for short).

Optionally, the terminal device in this embodiment of this application may be a device configured to implement a wireless communication function, for example, may be a terminal or a chip that can be used in a terminal. The terminal may be user equipment (UE), an access terminal, a terminal unit, a terminal station, a mobile station, a mobile console, a remote station, a remote terminal, a mobile device, a wireless communications device, a terminal agent, a terminal apparatus, or the like in an LTE system, an NR system, or a future evolved PLMN. The access terminal may be a cellular phone, a cordless phone, a session initiation protocol (SIP) phone, a wireless local loop (WLL) station, a personal digital assistant (PDA), a handheld device or a computing device having a wireless communication function, another processing device connected to a wireless modem, a vehicle-mounted device, a wearable device, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or in a fixed position.

Optionally, the access device in this embodiment of this application is a device that accesses a core network. For example, the access device may be a base station, a broadband network gateway (BNG), an aggregation switch, or a non-3GPP access device. The base station may include base stations in various forms, for example, a macro base station, a micro base station (also referred to as a small cell), a relay station, and an access point.

Optionally, in this embodiment of this application, a related function of the user plane function network element or the session management function network element may be implemented by one device, or may be jointly implemented by a plurality of devices, or may be implemented by one or more functional modules in one device. This is not specifically limited in this embodiment of this application. It can be understood that the foregoing function may be a function of a network element on a hardware device, or may be a software function run on dedicated hardware, or may be a function of a combination of hardware and software, or may be a virtualization function instantiated on a platform (for example, a cloud platform).

Figure 9:
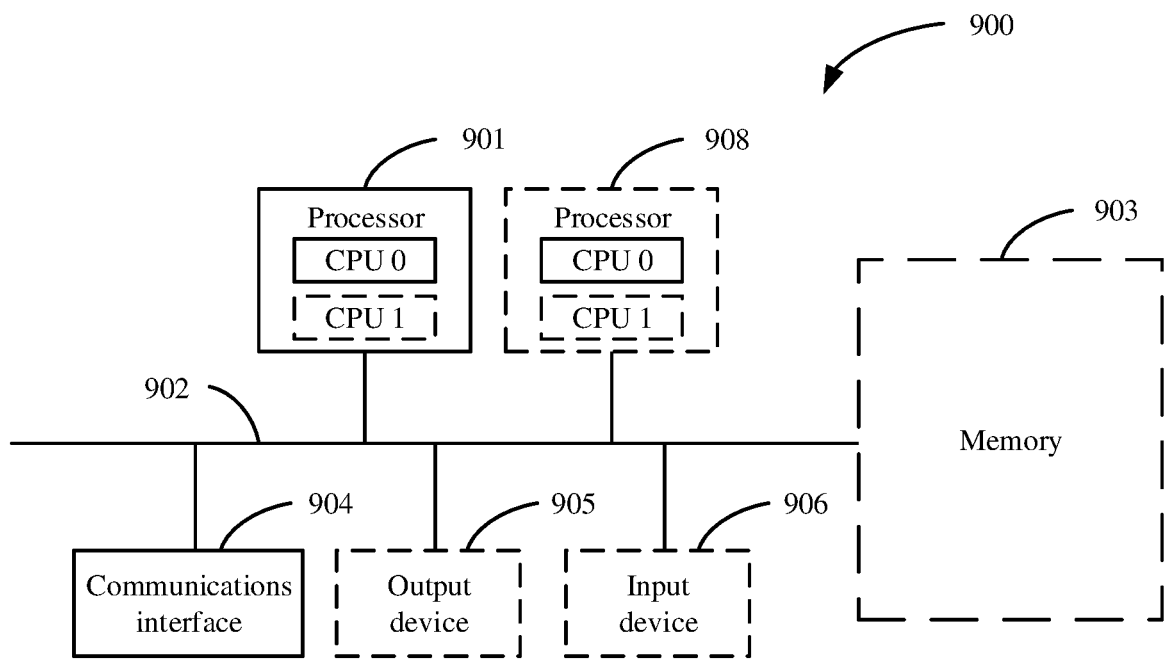
FIG. 9 is a schematic structural diagram of a communications device according to an embodiment of this application.

For example, a related function of the user plane function network element or the session management function network element in this embodiment of this application may be implemented by a communications device 900 in FIG. 9. FIG. 9 is a schematic structural diagram of the communications device 900 according to an embodiment of this application. The communications device 900 includes one or more processors 901, a communication line 902, and at least one communications interface (in FIG. 9, that the communications device 900 includes a communications interface 904 and one processor 901 is merely an example for description). Optionally, the communications device 900 may further include a memory 903.

The processor 901 may be a general-purpose central processing unit (CPU), a microprocessor, an application-specific integrated circuit (ASIC), or one or more integrated circuits for controlling program execution of the solutions of this application.

The communication line 902 may include a path used to connect different components.

The communications interface 904 may be a transceiver module configured to communicate with another device or a communications network such as the Ethernet, a RAN, or a wireless local area network (WLAN). For example, the transceiver module may be an apparatus such as a transceiver or a transceiver component. Optionally, the communications interface 904 may alternatively be a transceiver circuit located inside the processor 901, and is configured to implement signal input and signal output of the processor.

The memory 903 may be an apparatus having a storage function. For example, the memory 903 may be a read-only memory (ROM) or another type of static storage device that can store static information and an instruction, or a random access memory (RAM) or another type of dynamic storage device that can store information and an instruction. The memory 903 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that is accessible by a computer. However, the memory 903 is not limited thereto. The memory may exist independently, and is connected to the processor through the communication line 902. Alternatively, the memory may be integrated with the processor.

The memory 903 is configured to store a computer-executable instruction for executing the solutions in this application, and the processor 901 controls the execution of the computer-executable instruction. The processor 901 is configured to execute the computer-executable instruction stored in the memory 903, to implement a multicast communication method provided in the embodiments of this application.

Alternatively, optionally, in this embodiment of this application, the processor 901 may perform processing-related functions in the multicast communication method provided in the following embodiments of this application, and the communications interface 904 is responsible for communication with another device or a communications network. This is not specifically limited in this embodiment of this application.

Optionally, the computer-executable instruction in this embodiment of this application may also be referred to as application program code. This is not specifically limited in this embodiment of this application.

During specific implementation, in an embodiment, the processor 901 may include one or more CPUs, for example, a CPU 0 and a CPU 1 in FIG. 9.

During specific implementation, in an embodiment, the communications device 900 may include a plurality of processors, for example, the processor 901 and a processor 908 in FIG. 9. Each of the processors may be a single-core (single-CPU) processor or a multi-core (multi-CPU) processor. The processor herein may refer to one or more devices, circuits, and/or processing cores configured to process data (for example, a computer program instruction).

During specific implementation, in an embodiment, the communications device 900 may further include an output device 905 and an input device 906. The output device 905 communicates with the processor 901, and may display information in a plurality of manners. For example, the output device 905 may be a liquid crystal display (LCD), a light emitting diode (LED) display device, a cathode ray tube (CRT) display device, a projector (projector), or the like. The input device 906 communicates with the processor 901, and may receive an input of a user in a plurality of manners. For example, the input device 906 may be a mouse, a keyboard, a touchscreen device, a sensing device, or the like.

The communications device 900 may also be referred to as a communications apparatus sometimes, and may be a general-purpose device or a special-purpose device. For example, the communications device 900 may be a desktop computer, a portable computer, a network server, a palmtop computer (personal digital assistant, PDA), a mobile phone, a tablet computer, a wireless terminal device, an embedded device, the foregoing terminal device, the foregoing network device, or a device having a structure similar to the structure shown in FIG. 9. A type of the communications device 900 is not limited in this embodiment of this application.

The following describes in detail the multicast communication method provided in the embodiments of this application with reference to FIG. 1 to FIG. 9.

It should be noted that in the following embodiments of this application, names of messages between network elements, names of parameters in messages, or the like are merely examples, and there may be other names during specific implementation. This is not specifically limited in the embodiments of this application.

Figure 10:
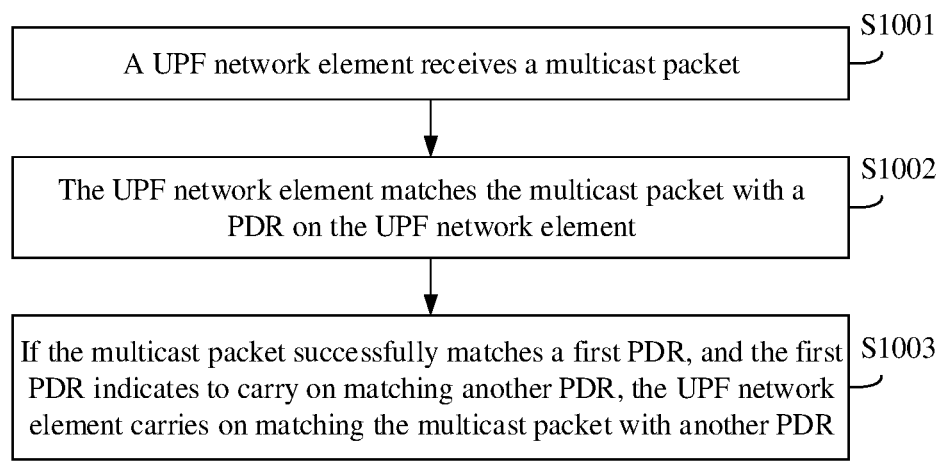
FIG. 10 is a schematic flowchart 1 of a multicast communication method according to an embodiment of this application.

For example, the communications system shown in FIG. 7 is used in the 5G network shown in FIG. 8. FIG. 10 shows a multicast communication method according to an embodiment of this application. The method includes the following steps.

S1001: A UPF network element receives a multicast packet, where the multicast packet includes a multicast address.

S1002: The UPF network element matches the multicast packet with a PDR on the UPF network element.

S1003: If the multicast packet successfully matches a first PDR, and the first PDR indicates to carry on matching another PDR, the UPF network element carries on matching the multicast packet with another PDR.

Optionally, in this embodiment of this application, a priority of the another PDR is not higher than that of the first PDR. A general description is provided herein, and details are not described below again.

For a process of configuring the first PDR and the another PDR on the UPF network element, refer to the embodiment shown in FIG. 5 or FIG. 6. Details are not described herein again.

It should be noted that both the first PDR and the another PDR in this embodiment of this application may be UL PDRs or DL PDRs. Alternatively, the first PDR in this embodiment of this application is a UL PDR, and the another PDR includes a UL PDR and/or a DL PDR. Alternatively, the first PDR in this embodiment of this application is a DL PDR, and the another PDR includes a UL PDR and/or a DL PDR. This is not specifically limited in this embodiment of this application.

Optionally, in this embodiment of this application, the multicast packet includes a broadcast packet, and correspondingly, the multicast address includes a broadcast address. Alternatively, the multicast packet includes a groupcast packet, and correspondingly, the multicast address includes a groupcast address. For related descriptions of the broadcast address or the groupcast address, refer to the preamble part of DESCRIPTION OF EMBODIMENTS, and details are not described herein again.

According to the multicast communication method, after the multicast packet successfully matches the first PDR, if the first PDR indicates to carry on matching another PDR, the UPF network element carries on matching the multicast packet with another PDR. In other words, the multicast packet received by the UPF network element may match a plurality of PDRs, so that the multicast packet can be forwarded to a plurality of terminal devices according to FARs, QERs, and URRs associated with the plurality of PDRs. In this solution, when a terminal device member changes, the SMF network element does not need to perform excessive operations. Therefore, compared with a solution in which indication information in a FAR needs to be correspondingly updated when a terminal device member changes, this solution can improve efficiency of forwarding a multicast packet, reduce a signaling interaction procedure that is related to FAR updating and that is between the SMF network element and the UPF network element, and reduce signaling overheads.

Actions of the UPF network element in the foregoing steps S1001 to S1003 may be performed by the processor 901 in the communications device 900 shown in FIG. 9 by invoking the application program code stored in the memory 903. This is not limited in this embodiment of this application.

The following describes the multicast communication method shown in FIG. 10 in detail with reference to a specific implementation.

Figure 11:
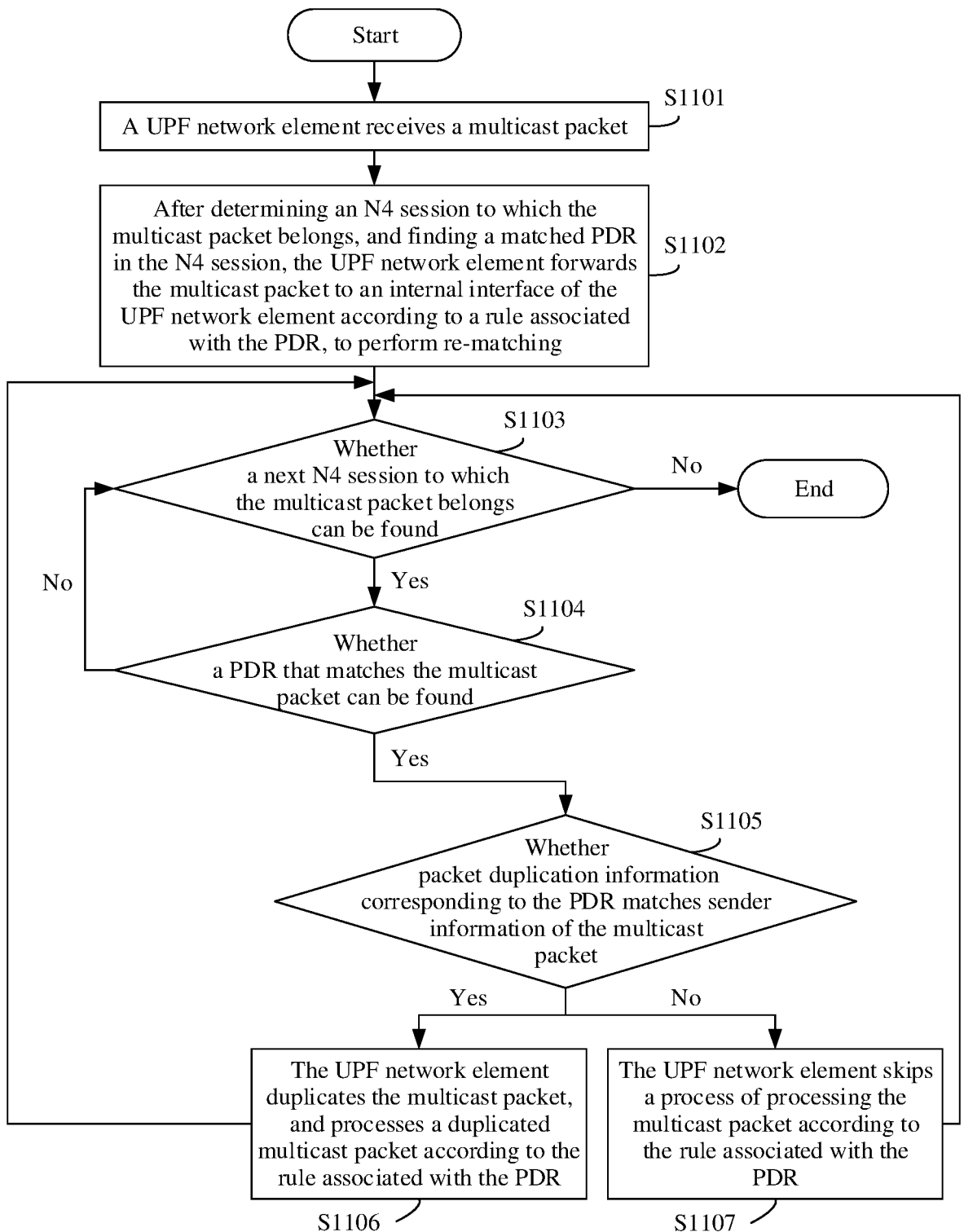
FIG. 11 is a schematic flowchart 2 of a multicast communication method according to an embodiment of this application.

In a possible implementation, when matching the multicast packet with the PDR on the UPF network element, the UPF network element first matches the multicast packet with an N4 session to which the PDR belongs. Further, the UPF network element matches the multicast packet with each of PDRs in the N4 session in descending order of priorities of the PDRs. Specifically, as shown in FIG. 11, a multicast communication method provided in an embodiment of this application includes the following steps.

S101: A UPF network element receives a multicast packet, where the multicast packet includes a multicast address.

Optionally, in this embodiment of this application, if the UPF network element receives the multicast packet from a terminal device, the multicast packet may further include sender information of the multicast packet. The sender information of the multicast packet includes address information of the terminal device that sends the multicast packet.

For example, the address information of the terminal device that sends the multicast packet may be, for example, an IP address or a MAC address of the terminal device. This is not specifically limited in this embodiment of this application.

Alternatively, optionally, in this embodiment of this application, if the UPF network element receives the multicast packet from an N19 tunnel or a DN, the UPF network element may further receive sender information of the multicast packet when receiving the multicast packet. The sender information of the multicast packet includes N19 indication information or N6 indication information. The N6 indication information or the N19 indication information is included in GTP-U tunnel header information for encapsulating the multicast packet.

For example, the N19 indication information in this embodiment of this application may be, for example, a GTP-U TEID of the N19 tunnel connecting the current UPF network element to another UPF network element.

For example, the N6 indication information in this embodiment of this application may be, for example, information about an N6 interface.

S1102: After determining an N4 session to which the multicast packet belongs, and finding a matched PDR in the N4 session, the UPF network element forwards the multicast packet to an internal interface of the UPF network element according to a rule associated with the PDR, to perform re-matching.

As described above, in this embodiment of this application, the rule associated with the PDR may include, for example, a FAR. Optionally, the rule associated with the PDR may further include a URR and a QER. A general description is provided herein, and details are not described below again.

Optionally, in this embodiment of this application, that the UPF network element determines the N4 session to which the multicast packet belongs may include the following:

The UPF network element determines network instance information and interface information that are corresponding to the multicast packet. If the interface information is the N19 interface information or the N6 interface information, the UPF network element determines, with reference to an association relationship 1 and based on the network instance information and the interface information that are corresponding to the multicast packet, the N4 session to which the multicast packet belongs on the UPF network element. The association relationship 1 includes an association relationship among the network instance information, the interface information and an identifier of the N4 session. Alternatively, if the interface information is N3 interface information (In other words, the UPF network element receives the multicast packet from the terminal device), the UPF network element determines, with reference to an association relationship 2 and based on the address information of the terminal device that sends the multicast packet, and the network instance information and the interface information that are corresponding to the multicast packet, the N4 session to which the multicast packet belongs on the UPF network element. The association relationship 2 includes an association relationship among the network instance information, the interface information, the address information of the terminal device that sends the multicast packet and an identifier of the N4 session.

Alternatively, optionally, in this embodiment of this application, that the UPF network element determines the N4 session to which the multicast packet belongs may include the following:

The UPF network element determines network instance information and interface information that are corresponding to the multicast packet. If the interface information is N19 interface information or N6 interface information, the UPF network element determines, with reference to a first target PDR and based on the network instance information and the interface information that are corresponding to the multicast packet, the N4 session to which the multicast packet belongs on the UPF network element. The first target PDR includes an association relationship among the network instance information, the interface information and an identifier of the N4 session. Alternatively, if the interface information is N3 interface information (In other words, the UPF network element receives the multicast packet from the terminal device), the UPF network element determines, with reference to a second target PDR and based on the address information of the terminal device that sends the multicast packet, and the network instance information and the interface information that are corresponding to the multicast packet, the N4 session to which the multicast packet belongs on the UPF network element. The second target PDR includes an association relationship among the network instance information, the interface information, the address information of the terminal device that sends the multicast packet and an identifier of the N4 session.

It should be noted that the first target PDR and the second target PDR in this embodiment of this application are special PDRs configured on the UPF network element, and are used to determine the N4 session to which the multicast packet belongs. A general description is provided herein, and details are not described below again. In addition, the first target PDR and the second target PDR in this embodiment of this application may be a same PDR, or may be different PDRs. This is not specifically limited in this embodiment of this application.

S1103: The UPF network element determines whether a next N4 session to which the multicast packet belongs can be found.

If the UPF network element determines that a next N4 session to which the multicast packet belongs can be found, the UPF network element performs the following step S1104. Alternatively, if the UPF network element determines that a next N4 session to which the multicast packet belongs cannot be found, the procedure ends.

S1104: The UPF network element matches the multicast packet with each of PDRs in the N4 session in descending order of priorities of the PDRs, to determine whether a PDR that matches the multicast packet exists.

For a process of matching the multicast packet with the PDR, refer to the process of matching a data packet with a PDR in the preamble part of DESCRIPTION OF EMBODIMENTS, and details are not described herein again.

If the UPF network element determines that a PDR that matches the multicast packet exists, and the PDR includes packet duplication information, the UPF network element performs the following step S1105. Alternatively, if the UPF network element determines that a PDR that matches the multicast packet does not exist, the UPF network element goes back to step S1103.

S1105: If the multicast packet successfully matches a PDR, the UPF network element determines whether packet duplication information corresponding to the PDR matches the sender information of the multicast packet.

If the UPF network element determines that the packet duplication information corresponding to the PDR matches the sender information of the multicast packet, the UPF network element performs the following step S1106, and then goes back to the foregoing step S1103. Alternatively, if the UPF network element determines that the packet duplication information corresponding to the PDR does not match the sender information of the multicast packet, the UPF network element performs the following step S1107, and then goes back to the foregoing step S1103.

Optionally, in this embodiment of this application, that the packet duplication information corresponding to the PDR matches the sender information of the multicast packet means that the packet duplication information corresponding to the PDR is different from the sender information of the multicast packet. That the packet duplication information corresponding to the PDR does not match the sender information of the multicast packet means that the packet duplication information corresponding to the PDR is the same as the sender information of the multicast packet. A general description is provided herein, and details are not described below again.

S1106: The UPF network element duplicates the multicast packet, and processes a duplicated multicast packet according to the rule associated with the PDR.

S1107: The UPF network element skips a process of processing the multicast packet according to the rule associated with the PDR.

In this embodiment of this application, it is considered by default that if a PDR that matches the multicast packet exists in the N4 session, the PDR indicates to carry on matching another PDR. Therefore, after the foregoing step S1106 or step S1107 is performed, the UPF network element may go back to the foregoing step S1103. For example, the PDR may include a type indication, an indication to carry on matching, the packet duplication information, or packet duplication skip information. The type indication, the indication to carry on matching, the packet duplication information, or the packet duplication skip information is used to indicate to carry on matching another PDR, and the type indication may indicate, for example, broadcast or groupcast.

It should be noted that this embodiment of this application is described by using an example in which the multicast packet is matched with another PDR on the UPF network element, and the duplicated multicast packet is processed according to the rule associated with the PDR. Certainly, alternatively, the UPF network element may match the duplicated multicast packet with another PDR on the UPF network element, and process, according to the rule associated with the current PDR, the multicast packet that matches the current PDR. This is not specifically limited in this embodiment of this application.

According to the multicast communication method provided in this embodiment of this application, after the multicast packet successfully matches to a PDR, if the PDR indicates to carry on matching another PDR, the UPF network element carries on matching the multicast packet with another PDR on the UPF network element. In other words, the multicast packet received by the UPF network element may match a plurality of PDRs, so that the multicast packet can be forwarded to a plurality of terminal devices according to rules associated with the plurality of PDRs. In this solution, when a terminal device member changes, an SMF network element does not need to perform excessive operations. Therefore, compared with a solution in which indication information in a FAR needs to be correspondingly updated when a terminal device member changes, this solution can improve efficiency of forwarding a multicast packet, reduce a signaling interaction procedure that is related to FAR updating and that is between the SMF network element and the UPF network element, and reduce signaling overheads.

Actions of the UPF network element in the foregoing steps S1101 to S1107 may be performed by the processor 901 in the communications device 900 shown in FIG. 9 by invoking the application program code stored in the memory 903. This is not limited in this embodiment of this application.

Figure 12:
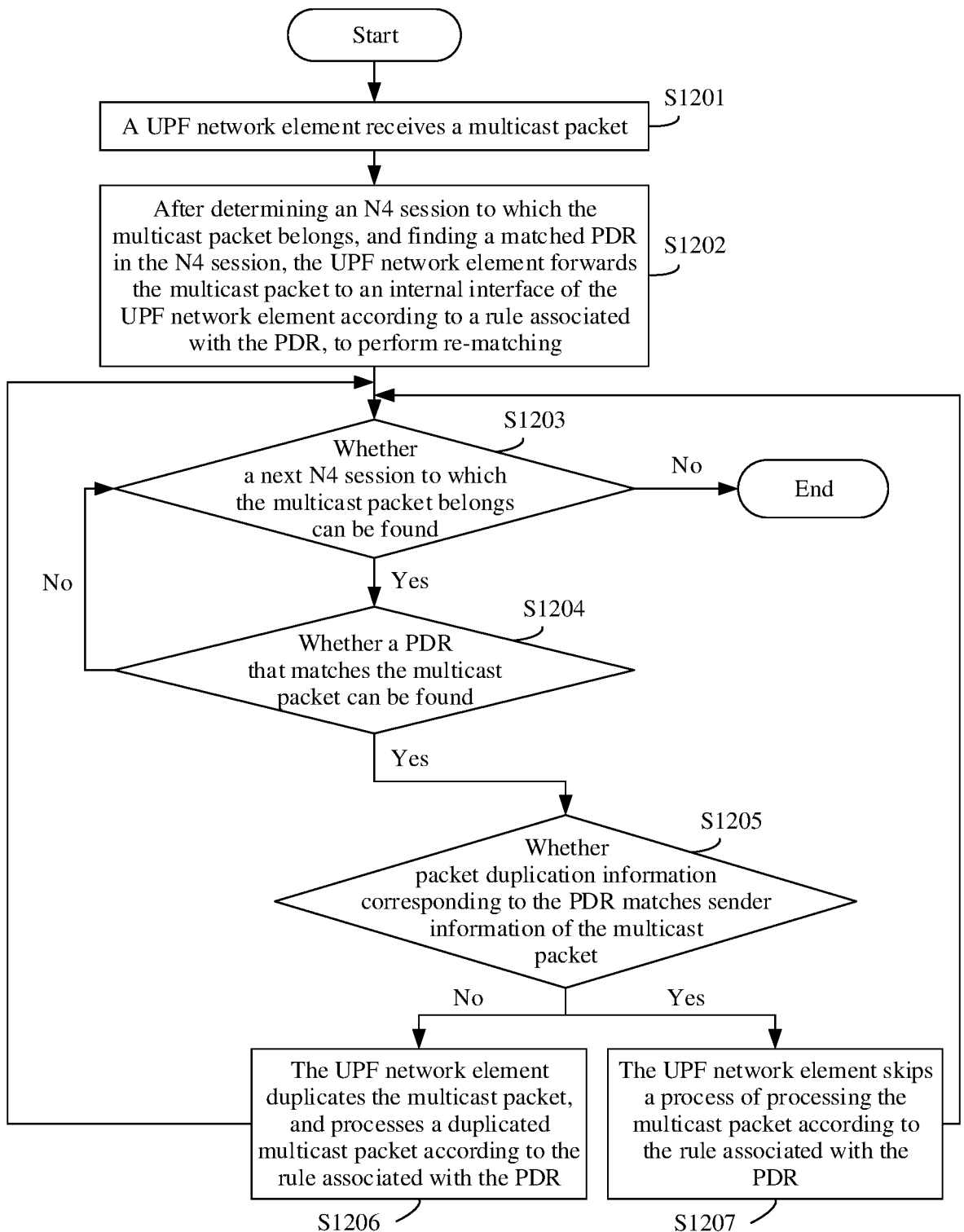
FIG. 12 is a schematic flowchart 3 of a multicast communication method according to an embodiment of this application.

Alternatively, in another possible implementation, when matching the multicast packet with the PDR on the UPF network element, the UPF network element first matches the multicast packet with an N4 session to which the PDR belongs. Further, the UPF network element matches the multicast packet with each of PDRs in the N4 session in descending order of priorities of the PDRs. Specifically, as shown in FIG. 12, a multicast communication method provided in an embodiment of this application includes the following steps.

Steps S1201 to S1203 are the same as steps S1101 to S1103 in the embodiment shown in FIG. 11. For related descriptions, refer to the embodiment shown in FIG. 11. Details are not described herein again.

S1204: The UPF network element matches the multicast packet with each of PDRs in the N4 session in descending order of priorities of the PDRs, to determine whether a PDR that matches the multicast packet exists.

For a process of matching the multicast packet with the PDR, refer to the process of matching a data packet with a PDR in the preamble part of DESCRIPTION OF EMBODIMENTS, and details are not described herein again.

If the UPF network element determines that a PDR that matches the multicast packet exists, and the PDR includes packet duplication skip information, the UPF network element performs the following step S1205. Alternatively, if the UPF network element determines that a PDR that matches the multicast packet does not exist, the UPF network element goes back to step S1203.

S1205: If the multicast packet successfully matches a PDR, the UPF network element determines whether packet duplication skip information corresponding to the PDR matches the sender information of the multicast packet.

If the UPF network element determines that the packet duplication skip information corresponding to the PDR does not match the sender information of the multicast packet, the UPF network element performs the following step S1206, and then goes back to the foregoing step S1203. Alternatively, if the UPF network element determines that the packet duplication skip information corresponding to the PDR matches the sender information of the multicast packet, the UPF network element performs the following step S1207, and then goes back to the foregoing step S1203.

Optionally, in this embodiment of this application, that the packet duplication skip information corresponding to the PDR matches the sender information of the multicast packet means that the packet duplication skip information corresponding to the PDR is the same as the sender information of the multicast packet. That the packet duplication skip information corresponding to the PDR does not match the sender information of the multicast packet means that the packet duplication skip information corresponding to the PDR is different from the sender information of the multicast packet. A general description is provided herein, and details are not described below again.

S1206: The UPF network element duplicates the multicast packet, and processes a duplicated multicast packet according to the rule associated with the PDR.

S1207: The UPF network element skips a process of processing the duplicated multicast packet according to the rule associated with the PDR.

In this embodiment of this application, it is considered by default that if a PDR that matches the multicast packet exists in the N4 session, the PDR indicates to carry on matching another PDR. Therefore, after the foregoing step S1206 or step S1207 is performed, the UPF network element may go back to the foregoing step S1203. For example, the PDR may include a type indication, an indication to carry on matching, packet duplication information, or the packet duplication skip information. The type indication, the indication to carry on matching, the packet duplication information, or the packet duplication skip information is used to indicate to carry on matching another PDR, and the type indication may indicate, for example, broadcast or groupcast.

It should be noted that this embodiment of this application is described by using an example in which the multicast packet is matched with another PDR on the UPF network element, and the duplicated multicast packet is processed according to the rule associated with the PDR. Certainly, alternatively, the UPF network element may match the duplicated multicast packet with another PDR on the UPF network element, and process, according to the rule associated with the current PDR, the multicast packet that matches the current PDR. This is not specifically limited in this embodiment of this application.

According to the multicast communication method provided in this embodiment of this application, after the multicast packet successfully matches to a PDR, if the PDR indicates to carry on matching another PDR, the UPF network element carries on matching the multicast packet with another PDR on the UPF network element. In other words, the multicast packet received by the UPF network element may match a plurality of PDRs, so that the multicast packet can be forwarded to a plurality of terminal devices according to rules associated with the plurality of PDRs. In this solution, when a terminal device member changes, an SMF network element does not need to perform excessive operations. Therefore, compared with a solution in which indication information in a FAR needs to be correspondingly updated when a terminal device member changes, this solution can improve efficiency of forwarding a multicast packet, reduce a signaling interaction procedure that is related to FAR updating and that is between the SMF network element and the UPF network element, and reduce signaling overheads.

Actions of the UPF network element in the foregoing steps S1201 to S1207 may be performed by the processor 901 in the communications device 900 shown in FIG. 9 by invoking the application program code stored in the memory 903. This is not limited in this embodiment of this application.

Figure 13:
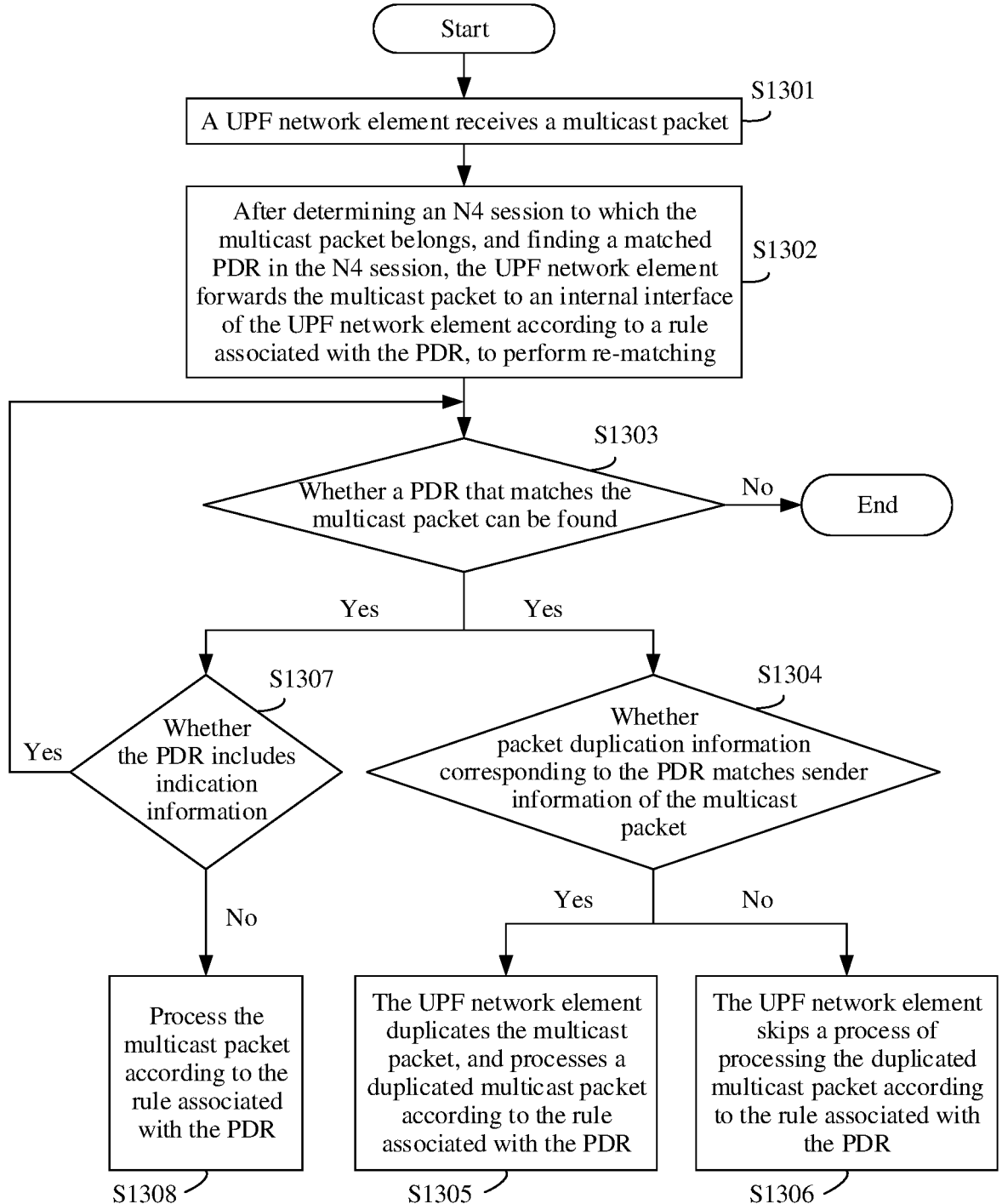
FIG. 13 is a schematic flowchart 4 of a multicast communication method according to an embodiment of this application.

Alternatively, in another possible implementation, when matching the multicast packet with the PDR on the UPF network element, the UPF network element directly matches the multicast packet with each of PDRs on the user plane function network element in descending order of priorities of the PDRs. Specifically, as shown in FIG. 13, a multicast communication method provided in an embodiment of this application includes the following steps.

Steps S1301 and S1302 are the same as steps S1101 and S1102 in the embodiment shown in FIG. 11. For related descriptions, refer to the embodiment shown in FIG. 11. Details are not described herein again.

S1303: The UPF network element matches the multicast packet with each of PDRs on the UPF network element in descending order of priorities of the PDRs, to determine whether a PDR that matches the multicast packet exists.

For a process of matching the multicast packet with the PDR, refer to the process of matching a data packet with a PDR in the preamble part of DESCRIPTION OF EMBODIMENTS, and details are not described herein again.

If the UPF network element determines that a PDR that matches the multicast packet exists, and the PDR includes packet duplication information, the UPF network element performs the following step S1304. Alternatively, if the UPF network element determines that a PDR that matches the multicast packet does not exist, the procedure ends.

Steps S1304 to S1306 are the same as steps S1105 to S1107 in the embodiment shown in FIG. 11. For related descriptions, refer to the embodiment shown in FIG. 11. Details are not described herein again.

S1307: If the multicast packet successfully matches a PDR, the UPF network element determines whether the PDR includes indication information, where the indication information indicates to carry on matching another PDR.

For example, the indication information may include, for example, a type indication, an indication to carry on matching, the packet duplication information, or packet duplication skip information, and the type indication may indicate, for example, broadcast or groupcast.

If the UPF network element determines that the PDR includes the indication information, the UPF network element goes back to step S1303. Alternatively, if the UPF network element determines that the PDR does not include the indication information, the UPF network element performs the following step S1308.

S1308: The UPF network element processes the current multicast packet according to a rule associated with the PDR.

Optionally, there is no necessary execution sequence between step S1304 and step S1307 in this embodiment of this application. Step S1304 may be performed before or after step S1307. Alternatively, step S1304 and step S1307 may be simultaneously performed. This is not specifically limited in this embodiment of this application.

Certainly, in this embodiment of this application, if the UPF network element can determine a type of the multicast packet based on a multicast address, the UPF network element may alternatively go back to step S1303. This is not specifically limited in this embodiment of this application.

It should be noted that this embodiment of this application is described by using an example in which the multicast packet is matched with another PDR on the UPF network element, and a duplicated multicast packet is processed according to the rule associated with the PDR. Certainly, alternatively, the UPF network element may match the duplicated multicast packet with another PDR on the UPF network element, and process, according to a FAR, a QER, and a URR that are associated with the current PDR, the multicast packet that matches the current PDR. This is not specifically limited in this embodiment of this application.

According to the multicast communication method provided in this embodiment of this application, after the multicast packet successfully matches with a PDR, if the PDR indicates to carry on matching another PDR, the UPF network element carries on matching the multicast packet with another PDR, on the UPF network element, whose priority is not higher than that of the PDR. In other words, the multicast packet received by the UPF network element may match a plurality of PDRs, so that the multicast packet can be forwarded to a plurality of terminal devices according to rules associated with the plurality of PDRs. In this solution, when a terminal device member changes, an SMF network element does not need to perform excessive operations. Therefore, compared with a solution in which indication information in a FAR needs to be correspondingly updated when a terminal device member changes, this solution can improve efficiency of forwarding a multicast packet, reduce a signaling interaction procedure that is related to FAR updating and that is between the SMF network element and the UPF network element, and reduce signaling overheads.

Actions of the UPF network element in the foregoing steps S1301 to S1308 may be performed by the processor 901 in the communications device 900 shown in FIG. 9 by invoking the application program code stored in the memory 903. This is not limited in this embodiment of this application.

Actions of the UPF network element in the foregoing steps S1301 to S1307 may be performed by the processor 901 in the communications device 900 shown in FIG. 9 by invoking the application program code stored in the memory 903. This is not limited in this embodiment of this application.

Figure 14:
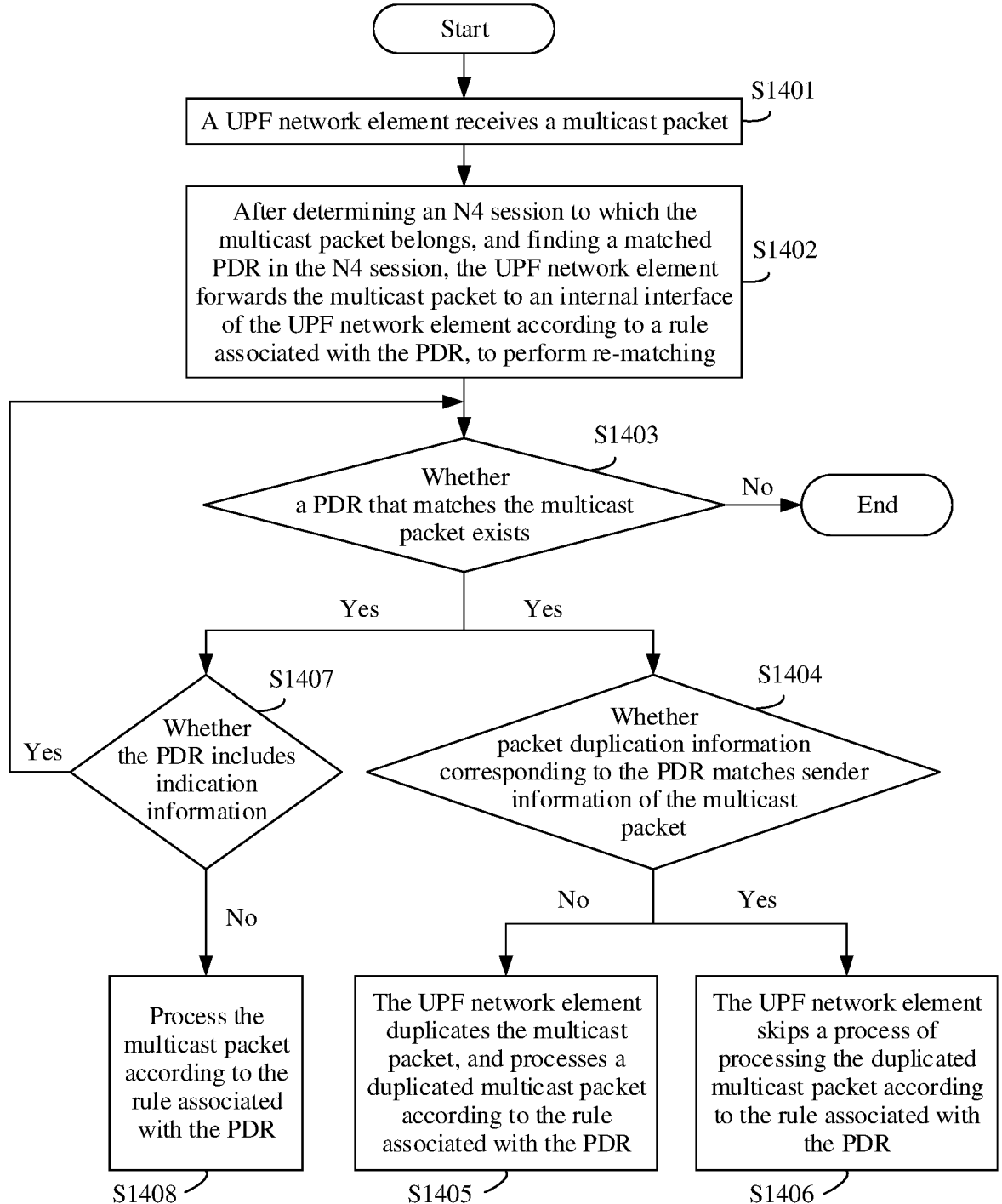
FIG. 14 is a schematic flowchart 5 of a multicast communication method according to an embodiment of this application.

Alternatively, in another possible implementation, when matching the multicast packet with the PDR on the UPF network element, the UPF network element directly matches the multicast packet with each of PDRs on the user plane function network element in descending order of priorities of the PDRs. Specifically, as shown in FIG. 14, a multicast communication method provided in an embodiment of this application includes the following steps.

Steps S1401 and S1402 are the same as steps S1101 and S1102 in the embodiment shown in FIG. 11. For related descriptions, refer to the embodiment shown in FIG. 11. Details are not described herein again.

S1403: The UPF network element matches the multicast packet with each of PDRs on the UPF network element in descending order of priorities of the PDRs, to determine whether a PDR that matches the multicast packet exists.

For a process of matching the multicast packet with the PDR, refer to the process of matching a data packet with a PDR in the preamble part of DESCRIPTION OF EMBODIMENTS, and details are not described herein again.

If the UPF network element determines that a PDR that matches the multicast packet exists, and the PDR includes packet duplication skip information, the UPF network element performs the following step S1404. Alternatively, if the UPF network element determines that a PDR that matches the multicast packet does not exist, the procedure ends.

Steps S1404 to S1406 are the same as steps S1205 to S1207 in the embodiment shown in FIG. 12. For related descriptions, refer to the embodiment shown in FIG. 12. Details are not described herein again.

S1407: If the multicast packet successfully matches a PDR, the UPF network element determines whether the PDR includes indication information, where the indication information indicates to carry on matching another PDR.

For example, the indication information may include, for example, a type indication, an indication to carry on matching, packet duplication information, or the packet duplication skip information, and the type indication may indicate, for example, broadcast or groupcast.

If the UPF network element determines that the PDR includes the indication information, the UPF network element goes back to step S1403. Alternatively, if the UPF network element determines that the PDR does not include the indication information, the UPF network element performs the following step S1408.

S1408: The UPF network element processes the current multicast packet according to a rule associated with the PDR.

Optionally, there is no necessary execution sequence between step S1404 and step S1407 in this embodiment of this application. Step S1404 may be performed before or after step S1407. Alternatively, step S1404 and step S1407 may be simultaneously performed. This is not specifically limited in this embodiment of this application.

Certainly, in this embodiment of this application, if the UPF network element can determine a type of the multicast packet based on a multicast address, the UPF network element may alternatively go back to step S1403. This is not specifically limited in this embodiment of this application.

It should be noted that this embodiment of this application is described by using an example in which the multicast packet is matched with another PDR on the UPF network element, and a duplicated multicast packet is processed according to the rule associated with the PDR. Certainly, alternatively, the UPF network element may match the duplicated multicast packet with another PDR on the UPF network element, and process, according to a FAR, a QER, and a URR that are associated with the current PDR, the multicast packet that matches the current PDR. This is not specifically limited in this embodiment of this application.

According to the multicast communication method provided in this embodiment of this application, after the multicast packet successfully matches to a PDR, if the PDR indicates to carry on matching another PDR, the UPF network element carries on matching the multicast packet with another PDR on the UPF network element. In other words, the multicast packet received by the UPF network element may match a plurality of PDRs, so that the multicast packet can be forwarded to a plurality of terminal devices according to rules associated with the plurality of PDRs. In this solution, when a terminal device member changes, an SMF network element does not need to perform excessive operations. Therefore, compared with a solution in which indication information in a FAR needs to be correspondingly updated when a terminal device member changes, this solution can improve efficiency of forwarding a multicast packet, reduce a signaling interaction procedure that is related to FAR updating and that is between the SMF network element and the UPF network element, and reduce signaling overheads.

Actions of the UPF network element in the foregoing steps S1401 to S1407 may be performed by the processor 901 in the communications device 900 shown in FIG. 9 by invoking the application program code stored in the memory 903. This is not limited in this embodiment of this application.

The following describes the multicast communication methods shown in FIG. 11 to FIG. 14 by using several specific examples.

Figure 15:
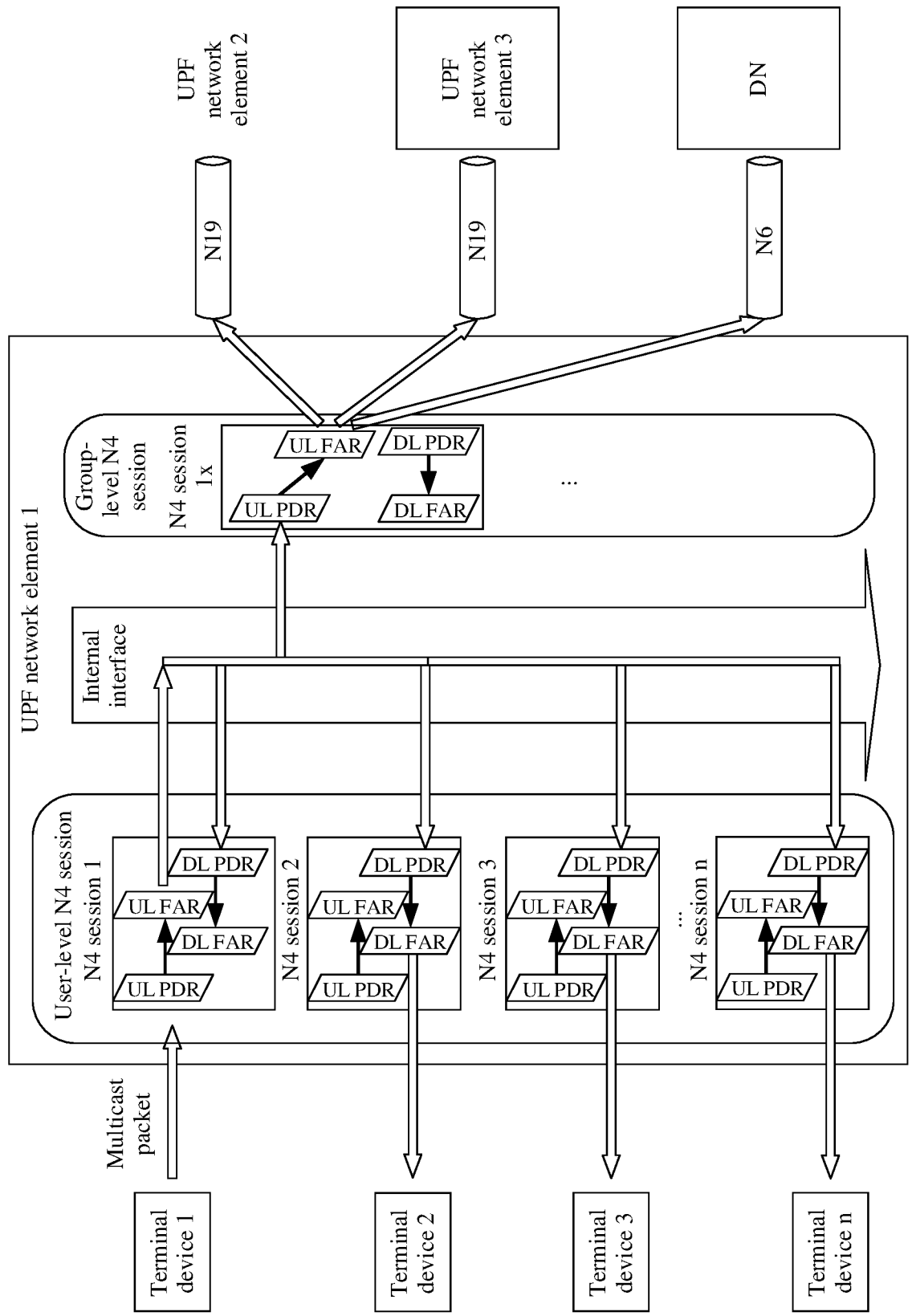
FIG. 15 is a schematic diagram 1 of an example of a multicast communication method according to an embodiment of this application.

For example, it is assumed that an SMF network element creates, on a UPF network element 1 for a group, n user-level N4 sessions and one group-level N4 session, which are shown in FIG. 15. In addition, routing rules shown in FIG. 15 are configured in the N4 session according to the procedure of configuring a routing rule shown in FIG. 5 or FIG. 6. Each group of routing rules includes a UL PDR, and a UL FAR, a UL QER (not shown), a UL URR (not shown) that are associated with the UL PDR; and a DL PDR, and a DL FAR, a DL QER (not shown), and a DL URR (not shown) that are associated with the DL PDR.

Step 1: After receiving a multicast packet from a terminal device 1, the UPF network element 1 determines an N4 session (namely, an N4 session 1 in FIG. 15) to which the multicast packet belongs, and finds a matched UL PDR in the N4 session. Then, the UPF network element 1 forwards the multicast packet to an internal interface of the UPF network element 1 according to a UL FAR, a UL QER, and a UL URR that are associated with the UL PDR, to perform re-matching.

Step 2: The UPF network element 1 determines whether a next N4 session to which the multicast packet belongs can be found. Herein, it is assumed that the next N4 session to which the multicast packet belongs is an N4 session 2, and after the UPF network element 1 matches the multicast packet with each of PDRs in the N4 session 2 in descending order of priorities of the PDRs, the UPF network element 1 determines that a DL PDR that matches the multicast packet exists. In addition, packet duplication information (which may be address information of a terminal device 2 herein) corresponding to the DL PDR matches sender information (which may be address information of the terminal device 1 herein) of the multicast packet. Alternatively, packet duplication skip information (which may be address information of a terminal device 2 herein) corresponding to the DL PDR does not match sender information (which may be address information of the terminal device 1 herein) of the multicast packet. In the foregoing cases, the UPF network element 1 may duplicate the multicast packet, and process a duplicated multicast packet according to a DL FAR, a DL QER, and a DL URR that are associated with the DL PDR. Then, the multicast packet may be transmitted to the terminal device 2.

Step 3: Assuming that the DL PDR that matches the multicast packet and that is in the N4 session 2 indicates to carry on matching another PDR, the UPF network element 1 continues to determine whether a next N4 session to which the multicast packet belongs can be found. Herein, it is assumed that the next N4 session to which the multicast packet belongs is the N4 session 1, and after the UPF network element 1 matches the multicast packet with each of PDRs in the N4 session 1 in descending order of priorities of the PDRs, the UPF network element 1 determines that a DL PDR that matches the multicast packet exists. In addition, packet duplication information (which may be the address information of the terminal device 1 herein) corresponding to the DL PDR does not match the sender information (which may be the address information of the terminal device 1 herein) of the multicast packet. Alternatively, packet duplication skip information (which may be the address information of the terminal device 1 herein) corresponding to the DL PDR matches the sender information of the multicast packet (which may be the address information of the terminal device 1 herein). In the foregoing cases, the UPF network element 1 skips a process of processing the multicast packet.

Step 4: Assuming that the DL PDR that matches the multicast packet and that is in the N4 session 1 indicates to carry on matching another PDR, the UPF network element 1 continues to determine whether a next N4 session to which the multicast packet belongs can be found. Herein, it is assumed that the next N4 session to which the multicast packet belongs is an N4 session 3, and after the UPF network element 1 matches the multicast packet with each of PDRs in the N4 session 3 in descending order of priorities of the PDRs, the UPF network element 1 determines that a DL PDR that matches the multicast packet exists. In addition, packet duplication information (which may be address information of a terminal device 3 herein) corresponding to the DL PDR matches the sender information (which may be the address information of the terminal device 1 herein) of the multicast packet. Alternatively, packet duplication skip information (which may be address information of a terminal device 3 herein) corresponding to the DL PDR does not match the sender information (which may be the address information of the terminal device 1 herein) of the multicast packet. In the foregoing cases, the UPF network element 1 may duplicate the multicast packet, and process a duplicated multicast packet according to a FAR, a QER, and a URR that are associated with the DL PDR. Then, the multicast packet may be transmitted to the terminal device 3.

Step 5: Assuming that the DL PDR that matches the multicast packet and that is in the N4 session 3 indicates to carry on matching another PDR, the UPF network element 1 continues to determine whether a next N4 session to which the multicast packet belongs can be found. Herein, it is assumed that the next N4 session to which the multicast packet belongs is an N4 session n, and after the UPF network element 1 matches the multicast packet with each of PDRs in the N4 session n in descending order of priorities of the PDRs, the UPF network element 1 determines that a DL PDR that matches the multicast packet exists. In addition, packet duplication information (which may be address information of a terminal device n herein) corresponding to the DL PDR matches the sender information (which may be the address information of the terminal device 1 herein) of the multicast packet. Alternatively, packet duplication skip information (which may be address information of a terminal device n herein) corresponding to the DL PDR does not match the sender information (which may be the address information of the terminal device 1 herein) of the multicast packet. In the foregoing cases, the UPF network element 1 may duplicate the multicast packet, and process a duplicated multicast packet according to a FAR, a QER, and a URR that are associated with the DL PDR. Then, the multicast packet may be transmitted to the terminal device n.

Step 6: Assuming that the DL PDR that matches the multicast packet and that is in the N4 session n indicates to carry on matching another PDR, the UPF network element 1 continues to determine whether a next N4 session to which the multicast packet belongs can be found. Herein, it is assumed that the next N4 session to which the multicast packet belongs is an N4 session ix, and after the UPF network element 1 matches the multicast packet with each of PDRs in the N4 session ix in descending order of priorities of the PDRs, the UPF network element 1 determines that a UL PDR that matches the multicast packet exists. In addition, packet duplication information (which may be N19 indication information herein) corresponding to the UL PDR matches the sender information (which may be the address information of the terminal device 1 herein) of the multicast packet. Alternatively, packet duplication skip information (which may be N19 indication information herein) corresponding to the UL PDR does not match the sender information (which may be the address information of the terminal device 1 herein) of the multicast packet. In the foregoing cases, the UPF network element 1 may duplicate the multicast packet, and process a duplicated multicast packet according to a FAR, a QER, and a URR that are associated with the UL PDR. Then, the multicast packet may be transmitted to a UPF network element 2, a UPF network element 3, and a DN.

The rest may be deduced by analogy, and the procedure ends until a next N4 session to which the multicast packet belongs cannot be found.

Figure 16:
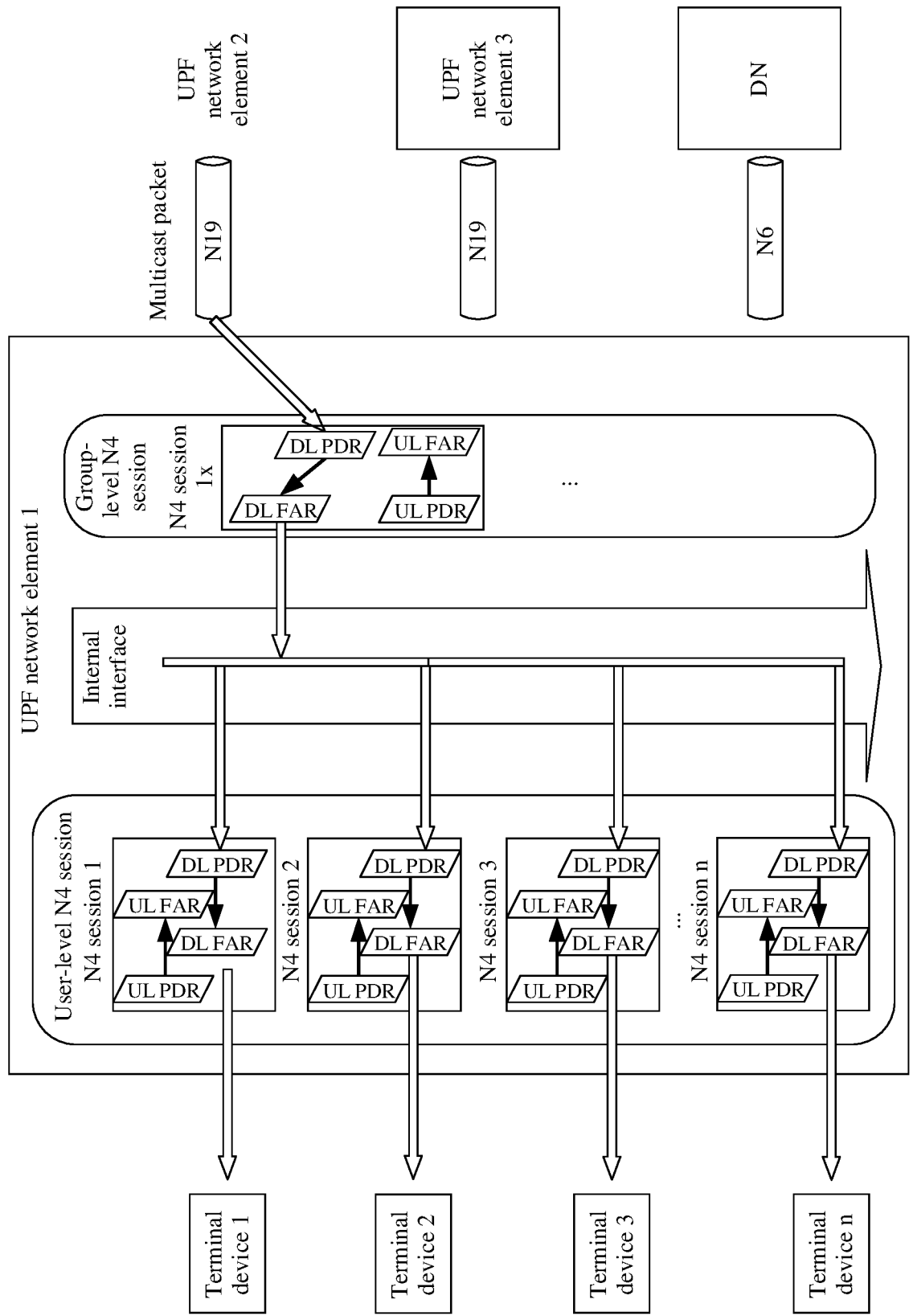
FIG. 16 is a schematic diagram 2 of an example of a multicast communication method according to an embodiment of this application.

Alternatively, for example, it is assumed that an SMF network element creates, on a UPF network element 1 for a group, n user-level N4 sessions and one group-level N4 session, which are shown in FIG. 16. In addition, routing rules shown in FIG. 16 are configured in the N4 session according to the procedure of configuring a routing rule shown in FIG. 5 or FIG. 6. Each group of routing rules includes a UL PDR, and a UL FAR, a UL QER (not shown), a UL URR (not shown) that are associated with the UL PDR; and a DL PDR, and a DL FAR, a DL QER (not shown), and a DL URR (not shown) that are associated with the DL PDR.

Step 1: After receiving a multicast packet from an N19 tunnel connecting the UPF network element 1 to a UPF network element 2, the UPF network element 1 determines an N4 session (namely, an N4 session ix in FIG. 16) to which the multicast packet belongs, and finds a matched DL PDR in the N4 session. Then, the UPF network element 1 forwards the multicast packet and N19 indication information to an internal interface of the UPF network element 1 according to a DL FAR, a DL QER, and a DL URR that are associated with the DL PDR, to perform re-matching.

Step 2: The UPF network element 1 determines whether a next N4 session to which the multicast packet belongs can be found. Herein, it is assumed that the next N4 session to which the multicast packet belongs is an N4 session 2, and after the UPF network element 1 matches the multicast packet with each of PDRs in the N4 session 2 in descending order of priorities of the PDRs, the UPF network element 1 determines that a DL PDR that matches the multicast packet exists. In addition, packet duplication information (which may be address information of a terminal device 2 herein) corresponding to the DL PDR matches sender information (which may be the N19 indication information herein) of the multicast packet. Alternatively, packet duplication skip information (which may be address information of a terminal device 2 herein) corresponding to the DL PDR does not match sender information (which may be the N19 indication information herein) of the multicast packet. In the foregoing cases, the UPF network element 1 may duplicate the multicast packet, and process a duplicated multicast packet according to a DL FAR, a DL QER, and a DL URR that are associated with the DL PDR. Then, the multicast packet may be transmitted to the terminal device 2.

Step 3: Assuming that the DL PDR that matches the multicast packet and that is in the N4 session 2 indicates to carry on matching another PDR, the UPF network element 1 continues to determine whether a next N4 session to which the multicast packet belongs can be found. Herein, it is assumed that the next N4 session to which the multicast packet belongs is an N4 session 1, and after the UPF network element 1 matches the multicast packet with each of PDRs in the N4 session 1 in descending order of priorities of the PDRs, the UPF network element 1 determines that a DL PDR that matches the multicast packet exists. In addition, packet duplication information (which may be address information of a terminal device 1 herein) corresponding to the DL PDR matches the sender information (which may be the N19 indication information herein) of the multicast packet. Alternatively, packet duplication skip information (which may be address information of a terminal device 1 herein) corresponding to the DL PDR does not match the sender information (which may be the N19 indication information herein) of the multicast packet. In the foregoing cases, the UPF network element 1 may duplicate the multicast packet, and process a duplicated multicast packet according to a DL FAR, a DL QER, and a DL URR that are associated with the DL PDR. Then, the multicast packet may be transmitted to the terminal device 1.

Step 4: Assuming that the DL PDR that matches the multicast packet and that is in the N4 session 1 indicates to carry on matching another PDR, the UPF network element 1 continues to determine whether a next N4 session to which the multicast packet belongs can be found. Herein, it is assumed that the next N4 session to which the multicast packet belongs is an N4 session 3, and after the UPF network element 1 matches the multicast packet with each of PDRs in the N4 session 3 in descending order of priorities of the PDRs, the UPF network element 1 determines that a DL PDR that matches the multicast packet exists. In addition, packet duplication information (which may be address information of a terminal device 3 herein) corresponding to the DL PDR matches the sender information (which may be the N19 indication information herein) of the multicast packet. Alternatively, packet duplication skip information (which may be address information of a terminal device 3 herein) corresponding to the DL PDR does not match the sender information (which may be the N19 indication information herein) of the multicast packet. In the foregoing cases, the UPF network element 1 may duplicate the multicast packet, and process a duplicated multicast packet according to a DL FAR, a DL QER, and a DL URR that are associated with the DL PDR. Then, the multicast packet may be transmitted to the terminal device 3.

Step 5: Assuming that the DL PDR that matches the multicast packet and that is in the N4 session 3 indicates to carry on matching another PDR, the UPF network element 1 continues to determine whether a next N4 session to which the multicast packet belongs can be found. Herein, it is assumed that the next N4 session to which the multicast packet belongs is an N4 session n, and after the UPF network element 1 matches the multicast packet with each of PDRs in the N4 session n in descending order of priorities of the PDRs, the UPF network element 1 determines that a DL PDR that matches the multicast packet exists. In addition, packet duplication information (which may be address information of a terminal device n herein) corresponding to the DL PDR matches the sender information (which may be the N19 indication information herein) of the multicast packet. Alternatively, packet duplication skip information (which may be address information of a terminal device n herein) corresponding to the DL PDR does not match the sender information (which may be the N19 indication information herein) of the multicast packet. In the foregoing cases, the UPF network element 1 may duplicate the multicast packet, and process a duplicated multicast packet according to a DL FAR, a DL QER, and a DL URR that are associated with the DL PDR. Then, the multicast packet may be transmitted to the terminal device n.

Step 6: Assuming that the DL PDR that matches the multicast packet and that is in the N4 session n indicates to carry on matching another PDR, the UPF network element 1 continues to determine whether a next N4 session to which the multicast packet belongs can be found. Herein, it is assumed that the next N4 session to which the multicast packet belongs is the N4 session ix, and after the UPF network element 1 matches the multicast packet with each of PDRs in the N4 session ix in descending order of priorities of the PDRs, the UPF network element 1 determines that a UL PDR that matches the multicast packet exists. In addition, packet duplication information (which may be the N19 indication information herein) corresponding to the UL PDR does not match the sender information (which may be the N19 indication information herein) of the multicast packet. Alternatively, packet duplication skip information (which may be the N19 indication information herein) corresponding to the DL PDR matches the sender information of the multicast packet (which may be the N19 indication information herein). In the foregoing cases, the UPF network element 1 skips a process of processing the multicast packet.

The rest may be deduced by analogy, and the procedure ends until a next N4 session to which the multicast packet belongs cannot be found.

It should be noted that the embodiment shown in FIG. 15 or FIG. 16 is described by using an example in which the packet duplication information corresponding to the UL PDR is the N19 indication information. Certainly, in the embodiment shown in FIG. 15 or FIG. 16, the packet duplication information corresponding to the UL PDR may alternatively include the N19 indication information and N6 indication information. In this case, that the packet duplication information corresponding to the PDR matches the sender information of the multicast packet may include: The packet duplication information corresponding to the PDR does not include the sender information of the multicast packet. That the packet duplication information corresponding to the PDR does not match the sender information of the multicast packet includes: The packet duplication information corresponding to the PDR includes the sender information of the multicast packet. Alternatively, that the packet duplication skip information corresponding to the PDR matches the sender information of the multicast packet may include: The packet duplication skip information corresponding to the PDR includes the sender information of the multicast packet. That the packet duplication skip information corresponding to the PDR does not match the sender information of the multicast packet includes: The packet duplication skip information corresponding to the PDR does not include the sender information of the multicast packet. A general description is provided herein, and details are not described below again.

It should be noted that, in the examples used for description in FIG. 15 and FIG. 16, the multicast packet is first matched with the N4 session, and then matched with the PDR in the N4 session. Certainly, alternatively, after the multicast packet is forwarded to the internal interface of the UPF network element 1 for re-matching, the UPF network element 1 may directly match the multicast packet with each of PDRs on the UPF network element 1 in descending order of priorities of the PDRs. Details are not described herein again.

It should be noted that, in the examples used for description in FIG. 15 and FIG. 16, the multicast packet is matched with another PDR on the UPF network element 1, and the duplicated multicast packet is processed according to the FAR, the QER, and the URR that are associated with the current PDR. Certainly, alternatively, the UPF network element 1 may match the duplicated multicast packet with another PDR on the UPF network element 1, and process, according to the FAR, the QER, and the URR that are associated with the current PDR, the multicast packet that matches the current PDR. Details are not described herein again.

Optionally, an embodiment of this application may further provide a multicast communication method. In the multicast communication method, after receiving a multicast packet, a UPF network element determines an N4 session to which the multicast packet belongs, and finds a matched PDR of a multicast type in the N4 session. A FAR associated with the PDR indicates the UPF network element to search for all target N4 sessions (excluding the current N4 session); duplicate a corresponding quantity of multicast packets based on information about the found target N4 sessions; and then match the multicast packet with each of PDRs in each of the found target N4 sessions. After the multicast packet successfully matches a PDR, the multicast packet is processed according to a FAR, a QER, and a URR that are associated with the PDR. In this solution, because the FAR does not need to explicitly indicate tunnel information or a label of a to-be-duplicated data packet, when a terminal device member changes, indication information in the FAR does not need to be updated. This improves efficiency of forwarding a multicast packet, reduces a signaling interaction procedure between an SMF network element and the UPF network element, and reduces signaling overheads.

It may be understood that, in the foregoing embodiments, the methods and/or the steps that are implemented by the user plane function network element may alternatively be implemented by a component that can be used on the user plane function network element. The methods and/or steps implemented by the session management function network element may alternatively be implemented by a component that can be used on the session management function network element.

The foregoing mainly describes the solutions provided in the embodiments of this application from a perspective of interaction between the network elements. Correspondingly, an embodiment of this application further provides a communications apparatus. The communications apparatus may be the user plane function network element in the foregoing method embodiment, or an apparatus including the user plane function network element, or a component that can be used on the user plane function network element. Alternatively, the communications apparatus may be the session management function network element in the foregoing method embodiment, or an apparatus including the session management function network element, or a component that can be used on the session management function network element. It can be understood that, to implement the foregoing functions, the communications apparatus includes a corresponding hardware structure and/or software module for performing the functions. A person skilled in the art should be easily aware that, in combination with the examples described in the embodiments disclosed in this specification, units and algorithm steps can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 17:
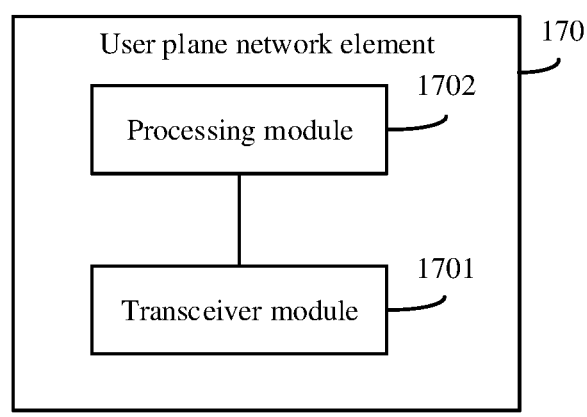
FIG. 17 is a schematic structural diagram of a user plane function network element according to an embodiment of this application.

For example, the communications apparatus is the user plane function network element in the foregoing method embodiment. FIG. 17 is a schematic structural diagram of a user plane function network element 170. The user plane function network element 170 includes a transceiver module 1701 and a processing module 1702. The transceiver module 1701 may also be referred to as a transceiver unit, and is configured to implement a transceiver function. For example, the transceiver module 1701 may be a transceiver circuit, a transceiver, a transceiver component, or a communications interface.

The transceiver module 1701 is configured to receive a multicast packet, where the multicast packet includes a multicast address. The processing module 1702 is configured to match the multicast packet with a PDR on the user plane function network element. The processing module 1702 is configured to: if the multicast packet successfully matches a first PDR, and the first PDR indicates to carry on matching another PDR, carry on matching the multicast packet with another PDR.

Optionally, the processing module 1702 is further configured to: if packet duplication information corresponding to the first PDR matches sender information of the multicast packet, duplicate the multicast packet, and process a duplicated multicast packet according to a rule associated with the first PDR.

Alternatively, optionally, the processing module 1702 is further configured to: if packet duplication information corresponding to the first PDR does not match sender information of the multicast packet, skip a process of processing the multicast packet according to a rule associated with the first PDR.

Optionally, the processing module 1702 is further configured to: if packet duplication skip information corresponding to the first PDR does not match sender information of the multicast packet, duplicate the multicast packet, and process a duplicated multicast packet according to a rule associated with the first PDR.

Alternatively, optionally, the processing module 1702 is further configured to: if packet duplication skip information corresponding to the first PDR matches sender information of the multicast packet, skip a process of processing the multicast packet according to a rule associated with the first PDR.

Optionally, the multicast packet includes the sender information of the multicast packet, and the sender information of the multicast packet includes address information of a terminal device that sends the multicast packet.

Alternatively, optionally, the transceiver module 1701 is further configured to receive the sender information of the multicast packet, where the sender information of the multicast packet includes N19 indication information or N6 indication information.

Optionally, that the processing module 1702 is configured to match the multicast packet with the PDR on the user plane function network element includes: The processing module 1702 is configured to: determine an N4 session that matches the multicast packet and that is on the user plane function network element; and match the multicast packet with each of PDRs in the N4 session in descending order of priorities of the PDRs.

Alternatively, optionally, that the processing module 1702 is configured to match the multicast packet with the PDR on the user plane function network element includes: The processing module 1702 is configured to: match the multicast packet with each of PDRs on the user plane function network element in descending order of priorities of the PDRs.

Optionally, the transceiver module 1701 is further configured to receive a first message from a session management function network element. The first message includes an N4 session identifier, the first PDR, and a FAR, a QER, and a URR that are associated with the first PDR. The first PDR is used to detect the multicast packet. The processing module 1702 is further configured to configure, in the N4 session corresponding to the N4 session identifier, the first PDR, and the FAR, the QER, and the URR that are associated with the first PDR.

Optionally, the transceiver module 1701 is further configured to receive an N4 session identifier and the first PDR from a session management function network element. The first PDR is used to detect the multicast packet. The processing module 1702 is further configured to configure the first PDR in the N4 session corresponding to the N4 session identifier.

All related content of the steps in the foregoing method embodiments may be cited in function descriptions of corresponding functional modules. Details are not described herein again.

In this embodiment, the user plane function network element 170 is presented in a form of functional modules obtained through division in an integrated manner. The "module" herein may be a specific ASIC, a circuit, a processor and a memory that execute one or more software or firmware programs, an integrated logic circuit, and/or another part that can provide the foregoing functions. In a simple embodiment, a person skilled in the art may figure out that the user plane function network element 170 may be in a form of the communications device 900 shown in FIG. 9.

For example, the processor 901 in the communications device 900 shown in FIG. 9 may invoke the computer-executable instruction stored in the memory 903, to enable the network device 900 to perform the multicast communication method in the foregoing method embodiment.

Specifically, functions/implementation processes of the transceiver module 1701 and the processing module 1702 in FIG. 17 may be implemented by the processor 901 in the communications device 900 shown in FIG. 9 by invoking the computer-executable instruction stored in the memory 903. Alternatively, a function/an implementation process of the processing module 1702 in FIG. 17 may be implemented by the processor 901 in the communications device 900 shown in FIG. 9 by invoking the computer-executable instruction stored in the memory 903, and a function/an implementation process of the transceiver module 1701 in FIG. 17 may be implemented by using the communications interface 904 in the communications device 900 shown in FIG. 9.

The user plane function network element 170 provided in this embodiment of this application can perform the foregoing multicast communication method. Therefore, for technical effects that can be achieved by the user plane function network element 170, refer to the foregoing method embodiment. Details are not described herein again.

Figure 18:
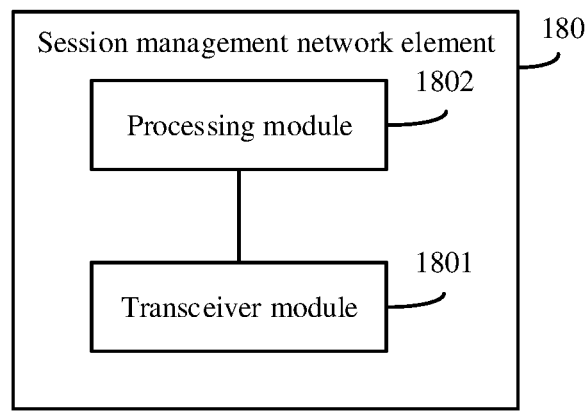
FIG. 18 is a schematic structural diagram of a session management function network element according to an embodiment of this application.

Alternatively, for example, the communications apparatus is the session management function network element in the foregoing method embodiment. FIG. 18 is a schematic structural diagram of a session management function network element 180. The session management function network element 180 includes a transceiver module 1801 and a processing module 1802. The transceiver module 1801 may also be referred to as a transceiver unit, and is configured to implement a transceiver function. For example, the transceiver module 1801 may be a transceiver circuit, a transceiver, a transceiver component, or a communications interface.

The processing module 1802 is configured to obtain a first PDR, where the first PDR is used to detect a multicast packet, and the first PDR indicates to carry on matching another PDR. The transceiver module 1801 is configured to send an N4 session identifier and the first PDR to a user plane function network element, where the N4 session identifier and the first PDR are used to configure the first PDR in an N4 session that is corresponding to the N4 session identifier and that is on the user plane function network element.

Optionally, the multicast packet is a broadcast packet, and correspondingly, the first PDR includes a broadcast address. The processing module 1802 is further configured to determine a first N4 session that is corresponding to a group and that is on the user plane function network element. The broadcast packet belongs to the group, and the first N4 session is any one of all N4 sessions that are corresponding to the group and that are on the user plane function network element. Correspondingly, the N4 session identifier is an identifier of the first N4 session.

Alternatively, optionally, the multicast packet is a groupcast packet, and correspondingly, the first PDR includes a groupcast address. The processing module 1802 is further configured to determine a second N4 session that is corresponding to a group and that is on the user plane function network element. The groupcast packet belongs to the group, and the second N4 session is any one of N4 sessions on the user plane function network element that are corresponding to the group and that support forwarding of the groupcast packet. Correspondingly, the N4 session identifier is an identifier of the second N4 session.

Optionally, that the processing module 1802 is configured to determine the second N4 session that is corresponding to the group and that is on the user plane function network element includes: The processing module 1802 is configured to determine, based on an IGMP join message, a NAS message, or an AF message, the second N4 session that is corresponding to the group and that is on the user plane function network element.

All related content of the steps in the foregoing method embodiments may be cited in function descriptions of corresponding functional modules. Details are not described herein again.

In this embodiment, the session management function network element 180 is presented in a form of functional modules obtained through division in an integrated manner. The "module" herein may be a specific ASIC, a circuit, a processor and a memory that execute one or more software or firmware programs, an integrated logic circuit, and/or another part that can provide the foregoing functions. In a simple embodiment, a person skilled in the art may figure out that the session management function network element 180 may be in a form of the communications device 900 shown in FIG. 9.

For example, the processor 901 in the communications device 900 shown in FIG. 9 may invoke the computer-executable instruction stored in the memory 903, to enable the network device 900 to perform the multicast communication method in the foregoing method embodiment.

Specifically, functions/implementation processes of the transceiver module 1801 and the processing module 1802 in FIG. 18 may be implemented by the processor 901 in the communications device 900 shown in FIG. 9 by invoking the computer-executable instruction stored in the memory 903. Alternatively, a function/an implementation process of the processing module 1802 in FIG. 18 may be implemented by the processor 901 in the communications device 900 shown in FIG. 9 by invoking the computer-executable instruction stored in the memory 903, and a function/an implementation process of the transceiver module 1801 in FIG. 18 may be implemented by using the communications interface 904 in the communications device 900 shown in FIG. 9.

The session management function network element 180 provided in this embodiment of this application can perform the foregoing multicast communication method. Therefore, for technical effects that can be achieved by the session management function network element 180, refer to the foregoing method embodiment. Details are not described herein again.

It should be noted that one or more of the foregoing modules or units may be implemented by using software, hardware, or a combination thereof. When any one of the foregoing modules or units is implemented by using software, the software exists in a form of a computer program instruction, and is stored in a memory. A processor may be configured to execute the program instruction to implement the foregoing method procedures. The processor may be integrated in an SoC (system on chip) or an ASIC, or may be an independent semiconductor chip. The processor includes a core configured to perform an operation or processing by executing a software instruction, and may further include a necessary hardware accelerator, for example, a field programmable gate array (FPGA), a PLD (programmable logic device), or a logic circuit that implements a dedicated logic operation.

When the foregoing modules or units are implemented by using hardware, the hardware may be any one of or any combination of a CPU, a microprocessor, a digital signal processing (DSP) chip, a microcontroller unit (MCU), an artificial intelligence processor, an ASIC, an SoC, an FPGA, a PLD, a dedicated digital circuit, a hardware accelerator, or a non-integrated discrete component, and the hardware may run necessary software or does not depend on software, to perform the foregoing method procedures.

Optionally, an embodiment of this application further provides a communications apparatus (for example, the communications apparatus may be a chip or a chip system). The communications apparatus includes a processor, configured to implement the method in any one of the foregoing method embodiments. In a possible design, the communications apparatus further includes a memory. The memory is configured to store a necessary program instruction and necessary data. The processor may invoke program code stored in the memory, to indicate the communications apparatus to perform the method in any one of the foregoing method embodiments. Certainly, the communications apparatus may not include the memory. When the communications apparatus is a chip system, the communications apparatus may include a chip, or may include a chip and another discrete component. This is not specifically limited in this embodiment of this application.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instruction is loaded and executed on a computer, the procedure or functions according to the embodiments of this application are all or partially generated. The computer may be a general-purpose computer, a special-purpose computer, a computer network, or another programmable apparatus. The computer instruction may be stored in a computer readable storage medium, or may be transmitted from one computer readable storage medium to another computer readable storage medium. For example, the computer instruction may be transmitted from a website, a computer, a server or a data center to another website, computer, server, or data center in a wired (for example, a coaxial cable, an optical fiber, or a digital subscriber line (DSL)) or wireless (for example, infrared, wireless, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprise" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and the accompanying drawings are merely example description of this application defined by the appended claims, and is considered as any of or all modifications, variations, combinations or equivalents that cover the scope of this application. It is clear that a person skilled in the art can make various modifications and variations to this application without departing from the spirit and scope of this application. This application is intended to cover the modifications and variations of this application provided that they fall within the scope of the claims of this application and their equivalent technologies.

What is claimed is:
1. A communication method comprising:
receiving, by a user plane function network element, a multicast packet, wherein the multicast packet comprises a multicast address;

matching, by the user plane function network element, the multicast packet with one or more packet detection rules (PDRs) on the user plane function network element; and when the multicast packet successfully matches a first PDR of the one or more PDRs, and the first PDR indicates to continue matching the multicast packet with another PDR, continuing, by the user plane function network element, matching the multicast packet with a second PDR of the one or more PDRs.

2. The method according to claim 1, wherein the method further comprises:

when packet duplication skip information corresponding to the first PDR does not match sender information of the multicast packet, duplicating, by the user plane function network element, the multicast packet, and processing, by the user plane function network element, a duplicated multicast packet according to a rule associated with the first PDR; or when the packet duplication skip information corresponding to the first PDR matches the sender information of the multicast packet, skipping, by the user plane function network element, processing the multicast packet according to a rule associated with the first PDR.

3. The method according to claim 2, wherein, that the packet duplication skip information corresponding to the first PDR matches the sender information of the multicast packet comprises:
the packet duplication skip information corresponding to the first PDR is same as the sender information of the multicast packet; and that the packet duplication skip information corresponding to the first PDR does not match the sender information of the multicast packet comprises:
the packet duplication skip information corresponding to the first PDR is different from the sender information of the multicast packet.

4. The method according to claim 2, wherein the multicast packet comprises the sender information of the multicast packet, and the sender information of the multicast packet comprises address information of a terminal device that sends the multicast packet.

5. The method according to claim 2, wherein the method further comprises:

receiving, by the user plane function network element, the sender information of the multicast packet, wherein the sender information of the multicast packet comprises N19 indication information or N6 indication information.

6. The method according to claim 5, wherein the N6 indication information or the N19 indication information is comprised in general packet radio service (GPRS) tunneling protocol-user plane (GTP-U) tunnel header information.

7. The method according to claim 1, wherein the matching, by the user plane function network element, the multicast packet with the one or more PDRs on the user plane function network element comprises:

determining, by the user plane function network element, an N4 session that matches the multicast packet and that is on the user plane function network element; and
matching, by the user plane function network element, the multicast packet with each of PDRs in the N4 session in descending order of priorities of the PDRs.

8. The method according to claim 1, wherein the first PDR comprises a type indication, an indication to continue matching, packet duplication information, or packet duplication skip information, and the type indication, the indication to continue matching, the packet duplication information, or the packet duplication skip information indicates to continue matching another PDR.

9. The method according to claim 1, wherein the method further comprises:

receiving, by the user plane function network element, an N4 session identifier and the first PDR from a session management function network element, wherein the first PDR is used to detect the multicast packet; and
configuring, by the user plane function network element, the first PDR in a N4 session corresponding to the N4 session identifier.

10. The method according to claim 1, wherein the multicast packet is a broadcast packet, and the multicast address is a broadcast address; or the multicast packet comprises a groupcast packet, and the multicast address is a groupcast address.

11. A communications apparatus, comprising:

at least one processor; and
a non-transitory memory coupled to the at least one processor and having program instructions stored thereon which, when executed by the at least one processor, cause the apparatus to:
obtain a first packet detection rule (PDR), wherein the first PDR is used to detect a multicast packet; and
send an N4 session identifier and the first PDR to a user plane function network element, the N4 session identifier corresponding to an N4 session, wherein the N4 session identifier and the first PDR enable the user plane function network element to configure the first PDR in the N4 session on the user plane function network element, and the first PDR indicates the user plane function network element to continue matching the multicast packet with another PDR after detection of the multicast packet.

12. The communication apparatus according to claim 11, wherein the first PDR comprises a type indication, an indication to continue matching, packet duplication information, or packet duplication skip information, and the type indication, the indication to continue matching, the packet duplication information, or the packet duplication skip information indicates to continue matching another PDR.

13. The communication apparatus according to claim 11, wherein the multicast packet is a broadcast packet, and the first PDR comprises a broadcast address; and the program instructions further cause the apparatus to:

determine a first N4 session that corresponds to a group and that is on the user plane function network element, wherein the broadcast packet belongs to the group, and the first N4 session is one of all N4 sessions that correspond to the group and that are on the user plane function network element, and wherein the N4 session identifier is an identifier of the first N4 session.

14. A communications apparatus, comprising:

at least one processor; and
a non-transitory memory coupled to the at least one processor and having program instructions stored thereon which, when executed by the at least one processor, cause the apparatus to:
receive a multicast packet, wherein the multicast packet comprises a multicast address;
match the multicast packet with one or more packet detection rules (PDRs) on the apparatus; and
continuing matching the multicast packet with a second PDR of the one or more PDRs when the multicast packet successfully matches a first PDR of the one or more PDRs, and the first PDR indicates to continue matching the multicast packet with another PDR.

15. The communication apparatus according to claim 14, wherein the program instructions further cause the apparatus to:
when packet duplication skip information corresponding to the first PDR does not match sender information of the multicast packet, duplicate the multicast packet, and process a duplicated multicast packet according to a rule associated with the first PDR; or
when the packet duplication skip information corresponding to the first PDR matches the sender information of the multicast packet, skip processing the multicast packet according to a rule associated with the first PDR.

16. The communication apparatus according to claim 15, wherein the multicast packet comprises the sender information of the multicast packet, and the sender information of the multicast packet comprises address information of a terminal device that sends the multicast packet.

17. The communication apparatus according to claim 15, wherein the program instructions further cause the apparatus to:
receive the sender information of the multicast packet, wherein the sender information of the multicast packet comprises N19 indication information or N6 indication information.

18. The communication apparatus according to claim 17, wherein the N6 indication information or the N19 indication information is comprised in general packet radio service (GPRS) tunneling protocol-user plane (GTP-U) tunnel header information.

19. The communication apparatus according to claim 14, wherein the program instructions further cause the apparatus to:
determine an N4 session that matches the multicast packet and that is on the apparatus; and
match the multicast packet with each of PDRs in the N4 session in descending order of priorities of the PDRs.

20. The communication apparatus according to claim 14, wherein the first PDR comprises a type indication, an indication to continue matching, packet duplication information, or packet duplication skip information, and the type indication, the indication to continue matching, the packet duplication information, or the packet duplication skip information indicates to continue matching another PDR.

21. The communication apparatus according to claim 14, wherein the program instructions further cause the apparatus to:
receive an N4 session identifier and the first PDR from a session management function network element, wherein the first PDR is used to detect the multicast packet; and
configure the first PDR in a N4 session corresponding to the N4 session identifier.

* * * * *